US012798232B2

(12) United States Patent
Nozawa et al.

(10) Patent No.: US 12,798,232 B2
(45) Date of Patent: Nov. 17, 2026

(54) CAPACITIVE LOAD DRIVE CIRCUIT AND LIQUID DISCHARGE DEVICE

(71) Applicant: SEIKO EPSON CORPORATION, Tokyo (JP)

(72) Inventors: Dai Nozawa, Matsumoto (JP); Noritaka Ide, Shiojiri (JP); Kunio Tabata, Shiojiri (JP); Rika Tanimoto, Matsumoto (JP); Satoru Uematsu, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 111 days.

(21) Appl. No.: 19/073,526

(22) Filed: Mar. 7, 2025

(65) Prior Publication Data

US 2025/0282137 A1 Sep. 11, 2025

(30) Foreign Application Priority Data

Mar. 8, 2024 (JP) ................................. 2024-035602

(51) Int. Cl.
*B41J 2/045* (2006.01)

(52) U.S. Cl.
CPC ......... *B41J 2/04541* (2013.01); *B41J 2/0455* (2013.01); *B41J 2/04581* (2013.01); *B41J 2/04588* (2013.01)

(58) Field of Classification Search
CPC .. B41J 2/04541; B41J 2/0455; B41J 2/04581; B41J 2/04588; B41J 2/01; B41J 29/38
USPC .............................................................. 347/9
See application file for complete search history.

(56) References Cited

U.S. PATENT DOCUMENTS

2022/0097364 A1 3/2022 Ide et al.
2023/0302788 A1* 9/2023 Ide ....................... B41J 2/04581
2024/0316918 A1* 9/2024 Nozawa ............... B41J 2/04541
2024/0316919 A1* 9/2024 Ide ....................... B41J 2/04541

FOREIGN PATENT DOCUMENTS

JP 2022-057167 A 4/2022

* cited by examiner

*Primary Examiner* — Jason S Uhlenhake
*Assistant Examiner* — Alexander D Shenderov
(74) *Attorney, Agent, or Firm* — Harness, Dickey & Pierce, P.L.C.

(57) ABSTRACT

A capacitive load drive circuit includes: a first digital amplifier circuit configured to output a first amplified signal to a first output node; a bootstrap circuit that includes a capacitor element coupled to the first output node and a second output node and a diode element including an anode terminal coupled to a third propagation node and a cathode terminal coupled to the second output node; a second digital amplifier circuit coupled to the first output node and the second output node and configured to output a second amplified signal to a third output node; a smoothing circuit configured to smooth the second amplified signal; and a voltage limiting circuit that is configured to switch a conduction state between the third propagation node and the second output node according to a potential difference between the third propagation node and the second output node.

12 Claims, 7 Drawing Sheets

CAPACITIVE LOAD DRIVE CIRCUIT AND LIQUID DISCHARGE DEVICE

The present application is based on, and claims priority from JP Application Serial Number 2024-035602, filed Mar. 8, 2024, the disclosure of which is hereby incorporated by reference herein in its entirety.

BACKGROUND

1. Technical Field

The present disclosure relates to a capacitive load drive circuit and a liquid discharge device.

2. Related Art

As a liquid discharge device that discharges a liquid to form an image or a document on a medium, a liquid discharge device using piezoelectric elements is known. In such a liquid discharge device, the piezoelectric elements are provided to correspond respectively to a plurality of nozzles that discharge the liquid and are driven according to drive signals. When the piezoelectric elements are driven, the liquid is discharged from the nozzle provided corresponding to the piezoelectric element. To operate such a piezoelectric element, it is necessary to supply a sufficient current. Therefore, a drive circuit that outputs the drive signal for driving the piezoelectric element includes an amplifier circuit that amplifies a source signal that is the basis of the drive signal.

JP-A-2022-057167 discloses a drive circuit capable of efficiently amplifying a signal by including a pulse modulation circuit that modulates a base drive signal serving as a basis of a drive signal and outputs a modulation signal, an amplifier circuit that outputs an amplified modulation signal obtained by amplifying the modulation signal from a first output point, a level shift circuit that outputs a level shift amplified modulation signal obtained by shifting a potential of the amplified modulation signal from a second output point, and a demodulation circuit that demodulates the level shift amplified modulation signal and outputs a drive signal.

However, in the liquid discharge device disclosed in JP-A-2022-057167, a distortion may occur in a signal waveform of the output drive signal according to an amount of a current supplied to a load, and there is room for improvement.

SUMMARY

One aspect of a capacitive load drive circuit according to the present disclosure is a capacitive load drive circuit for outputting a drive signal for driving a capacitive load, and the capacitive load drive circuit includes:

- a first digital amplifier circuit that is electrically coupled to a first propagation node configured to allow a first voltage signal of a first potential to propagate therethrough and a second propagation node configured to allow a second voltage signal of a second potential to propagate therethrough, and that is configured to output a first amplified signal to a first output node;
- a bootstrap circuit that is electrically coupled to the first output node and a third propagation node configured to allow a third voltage signal of a third potential to propagate therethrough and that is configured to output a boot voltage signal to a second output node;

- a second digital amplifier circuit coupled to the first output node and the second output node and configured to output a second amplified signal to a third output node;
- a smoothing circuit configured to smooth the second amplified signal and output the second amplified signal thus smoothed as the drive signal; and
- a voltage limiting circuit electrically coupled to the third propagation node and the second output node and configured to switch a conduction state between the third propagation node and the second output node, in which
- the bootstrap circuit includes a capacitor element including one end electrically coupled to the first output node and the other end electrically coupled to the second output node, and a diode element including an anode terminal electrically coupled to the third propagation node and a cathode terminal electrically coupled to the second output node, and
- the voltage limiting circuit switches the conduction state between the third propagation node and the second output node according to a potential difference between the third propagation node and the second output node.

One aspect of a liquid discharge device according to the present disclosure includes:

- a discharge unit configured to discharge a liquid by driving of a capacitive load; and
- a capacitive load drive circuit configured to output a drive signal for driving the capacitive load, in which
- the capacitive load drive circuit includes
  - a first digital amplifier circuit that is electrically coupled to a first propagation node configured to allow a first voltage signal of a first potential to propagate therethrough and a second propagation node configured to allow a second voltage signal of a second potential to propagate therethrough, and that is configured to output a first amplified signal to a first output node,
  - a bootstrap circuit that is electrically coupled to the first output node and a third propagation node configured to allow a third voltage signal of a third potential to propagate therethrough and that is configured to output a boot voltage signal to a second output node,
  - a second digital amplifier circuit coupled to the first output node and the second output node and configured to output a second amplified signal to a third output node,
  - a smoothing circuit configured to smooth the second amplified signal and output the second amplified signal thus smoothed as the drive signal, and
  - a voltage limiting circuit electrically coupled to the third propagation node and the second output node and configured to switch a conduction state between the third propagation node and the second output node, in which
- the bootstrap circuit includes a capacitor element including one end electrically coupled to the first output node and the other end electrically coupled to the second output node, and a diode element including an anode terminal electrically coupled to the third propagation node and a cathode terminal electrically coupled to the second output node, and
- the voltage limiting circuit switches the conduction state between the third propagation node and the second output node according to a potential difference between the third propagation node and the second output node.

DESCRIPTION OF EMBODIMENTS

A preferred embodiment of the present disclosure will hereinafter be described using the drawings. The drawings to be used are for the sake of convenience of description. The embodiment to be described below does not unduly limit the contents of the present disclosure described in the claims. All the configurations to be described below are not necessarily essential elements of the present disclosure.

In the following description, a consumer inkjet printer, which is a serial-type inkjet printer, is used as an example of a liquid discharge device according to the present disclosure. However, the liquid discharge device is not limited to the serial-type inkjet printer, and may be a line-type inkjet printer. Further, the liquid discharge device is not limited to an inkjet printer, and may be, for example, a color material discharge device used for manufacturing a color filter for a liquid crystal display or the like, an electrode material discharge device used for forming electrodes for an organic EL display or a field emission display or the like, or a bioorganic material discharge device used for manufacturing biochips.

1. Overview of Liquid Discharge Device

Figure 1:
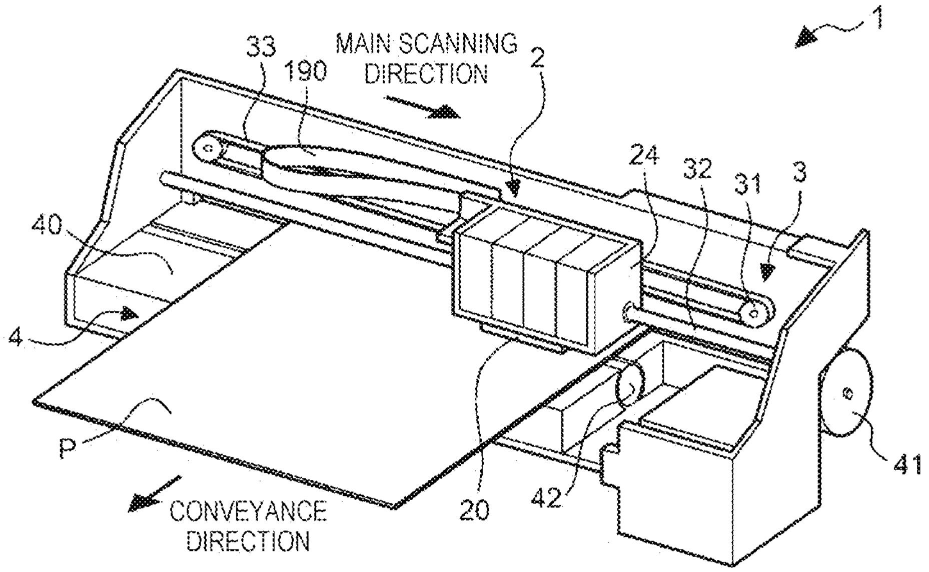
FIG. 1 is a diagram showing an example of a structure of a liquid discharge device.

FIG. 1 is a diagram showing an example of a structure of a liquid discharge device 1. As shown in FIG. 1, the liquid discharge device 1 includes a movable object 2 and a moving unit 3 that reciprocates the movable object 2 along a main scanning direction.

The moving unit 3 includes a carriage motor 31 that is a drive source of the reciprocating movement along the main scanning direction of the movable object 2, a carriage guide shaft 32 having both fixed ends, and a timing belt 33 that extends substantially parallel to the carriage guide shaft 32 and is driven by the carriage motor 31.

The movable object 2 includes a carriage 24. The carriage 24 is supported by the carriage guide shaft 32 in a reciprocally movable manner and is fixed to a part of the timing belt 33. When the timing belt 33 travels forward and backward by the carriage motor 31, the movable object 2 including the carriage 24 reciprocates while being guided by the carriage guide shaft 32. A head unit 20 is located in a portion of the movable object 2 that faces a medium P. The head unit 20 is mounted on the carriage 24. A large number of nozzles that discharge ink as a liquid are located on a surface of the head unit 20 that faces the medium P. Various control signals for controlling an operation of the head unit 20 are supplied to the head unit 20 via a cable 190. A flexible flat cable or the like that can slide following the reciprocating movement of the movable object 2 can be used as the cable 190.

The liquid discharge device 1 includes a conveyance unit 4 that conveys the medium P on a platen 40 along a conveyance direction. The conveyance unit 4 includes a conveyance motor 41 that is a drive source for conveying the medium P and a conveyance roller 42 that conveys the medium P along the conveyance direction by rotating with a drive force of the conveyance motor 41.

In the liquid discharge device 1 having the configuration as described above, the head unit 20 discharges the ink onto the medium P in synchronization with a timing at which the medium P is conveyed by the conveyance unit 4. Accordingly, the ink discharged by the head unit 20 lands on the medium P at a desired position, and a desired image or character is formed on a surface of the medium P.

Figure 2:
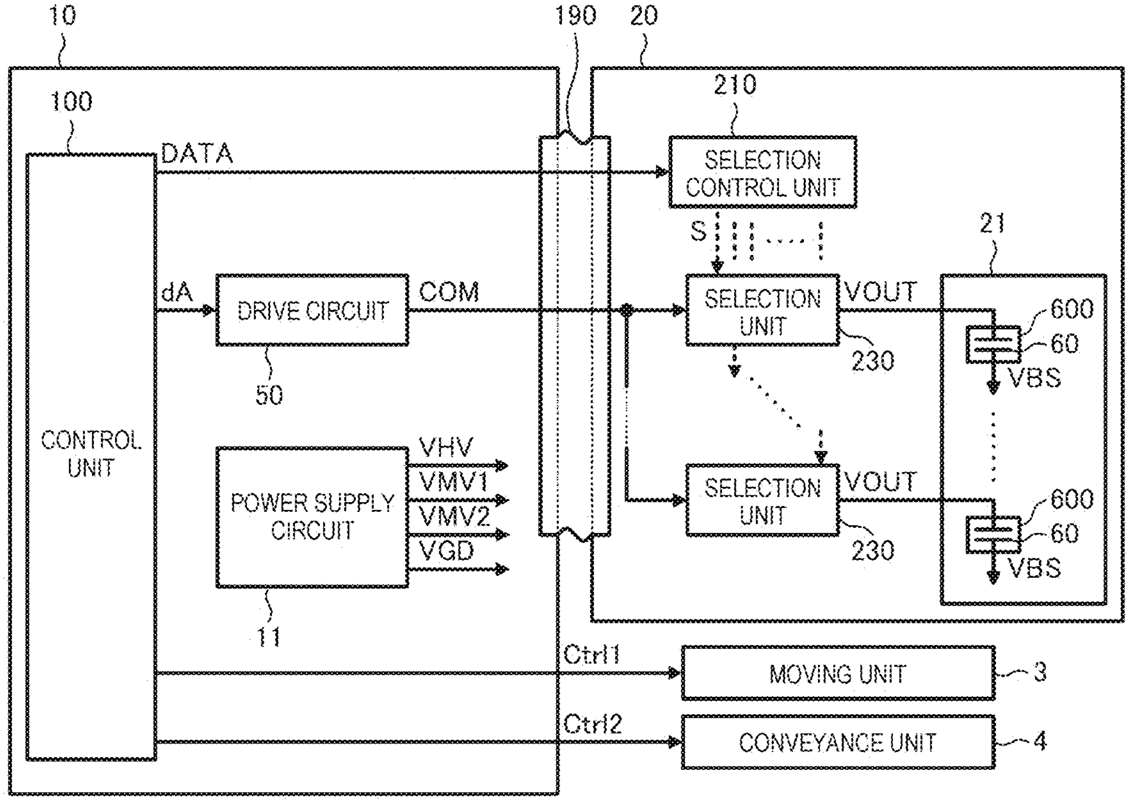
FIG. 2 is a diagram showing a functional configuration of the liquid discharge device.

Next, a functional configuration of the liquid discharge device 1 will be described. FIG. 2 is a diagram showing the functional configuration of the liquid discharge device 1. As shown in FIG. 2, the liquid discharge device 1 includes a control unit 10, the head unit 20, the moving unit 3, the conveyance unit 4, and the cable 190. The cable 190 electrically couples the control unit 10 and the head unit 20.

The control unit 10 includes a power supply circuit 11, a control circuit 100, and a drive circuit 50.

The power supply circuit 11 generates voltage signals VHV, VMV1, VMV2, and VDG having predetermined voltage values from a commercial AC power supply supplied from an outside of the liquid discharge device 1, and outputs the voltage signals to units of the liquid discharge device 1, respectively. Here, the voltage signal VHV is, for example, a DC voltage of 42 V, the voltage signal VMV1 is, for example, a DC voltage of 20 V, the voltage signal VMV2 is, for example, a DC voltage of 18 V, and the voltage signal VGD is, for example, a DC voltage of 7.5 V. The power supply circuit 11 may output DC voltages having different voltage values in addition to the voltage signals VHV, VMV1, VMV2, and VGD. Here, in the following description, a voltage value of the voltage signal VHV may be referred to as a voltage vhv, a voltage value of the voltage signal VMV1 may be referred to as a voltage vmv1, a voltage value of the voltage signal VMV2 may be referred to as a voltage vmv2, and a voltage value of the voltage signal VGD may be referred to as a voltage vgd.

Image data is supplied to the control circuit 100 from an external device (not shown) provided outside the liquid discharge device 1, such as a host computer. The control circuit 100 performs various types of image processing or the like on the supplied image data to generate various control signals for controlling the units of the liquid discharge device 1 and output the various control signals to the units, respectively.

Specifically, the control circuit 100 generates a control signal Ctrl1 for controlling the reciprocating movement of the movable object 2 based on the image data and outputs the control signal Ctrl1 to the carriage motor 31 included in the moving unit 3. The control circuit 100 generates a control signal Ctrl2 for controlling the conveyance of the medium P based on the image data and outputs the control signal Ctrl2 to the conveyance motor 41 included in the conveyance unit 4. Accordingly, the control circuit 100 controls the reciprocating movement of the movable object 2 along the main scanning direction and the conveyance of the medium P along the conveyance direction. That is, the head unit 20 can discharge the ink onto the medium P at a predetermined timing synchronized with the conveyance of the medium P. Accordingly, the ink can land on the medium P at a desired position, and a desired image or character can be formed on the medium P.

The control circuit 100 may perform signal conversion on the control signal Ctrl1 for controlling the reciprocating movement of the movable object 2 by a carriage motor driver (not shown), and then supply the converted control signal Ctrl1 to the moving unit 3. Similarly, the control circuit 100 may perform signal conversion on the control signal Ctrl2 for controlling the conveyance of the medium P by a conveyance motor driver (not shown), and then supply the converted control signal Ctrl2 to the conveyance unit 4.

The control circuit 100 outputs a base drive signal dA to the drive circuit 50. The base drive signal dA is a digital signal including information for defining a signal waveform of the drive signal COM supplied to the head unit 20. The drive circuit 50 converts the base drive signal dA into an analog signal, and then amplifies the analog signal obtained by the conversion to generate the drive signal COM. Then, the drive circuit 50 outputs the generated drive signal COM to the head unit 20. Details of a configuration and an operation of the drive circuit 50 will be described below.

The control circuit 100 generates a drive data signal DATA for controlling the operation of the head unit 20 and outputs the drive data signal DATA to the head unit 20. The head unit 20 includes a selection control unit 210, a plurality of selection units 230, and a liquid discharge head 21. The liquid discharge head 21 includes a plurality of discharge units 600 each including a piezoelectric element 60. The plurality of selection units 230 are provided corresponding to the piezoelectric elements 60 included in the plurality of discharge units 600 included in the liquid discharge head 21, respectively.

The drive data signal DATA is input to the selection control unit 210. The selection control unit 210 operates using the voltage signal VHV as driving power. The selection control unit 210 generates a signal for instructing whether to select the drive signal COM, corresponding to each of the selection units 230 based on the drive data signal DATA, generates a selection signal S obtained by level-shifting the generated signal to high amplitude logic signal based on the voltage signal VHV, and outputs the selection signal S to the corresponding selection unit 230. The drive signal COM and the corresponding selection signal S are input to each of the plurality of selection units 230. Each of the plurality of selection units 230 generates the drive signal VOUT by selecting or not selecting the drive signal COM based on the selection signal S and outputs the drive signal VOUT. That is, each of the plurality of selection units 230 generates the drive signal VOUT based on the drive signal COM and supplies the drive signal VOUT to one end of the piezoelectric element 60 included in the corresponding discharge unit 600 included in the liquid discharge head 21.

A reference voltage signal VBS is commonly supplied to the other ends of the piezoelectric elements 60 included in the plurality of discharge units 600. The reference voltage signal VBS is a signal functioning as a reference potential for driving the piezoelectric element 60 driven by the drive signal VOUT, and is a signal having a constant potential of, for example, 5.5 V, 6 V, or 0 V.

The piezoelectric elements 60 are provided corresponding to the plurality of nozzles in the head unit 20, respectively. The piezoelectric element 60 is driven according to a potential difference between the drive signal VOUT supplied to one end and the reference voltage signal VBS supplied to the other end. As a result, an amount of ink corresponding to a drive amount of the piezoelectric element 60 is discharged from the discharge unit 600 including the piezoelectric element 60.

FIG. 2 shows a case where the head unit 20 includes one liquid discharge head 21. The number of the liquid discharge heads 21 included in the head unit 20 is not limited to one. That is, the head unit 20 may include a plurality of liquid discharge heads 21 according to the type, the number, or the like of the ink to be discharged.

As described above, the liquid discharge device 1 according to the embodiment includes the liquid discharge head 21 that includes the plurality of piezoelectric elements 60 driven by being supplied with the drive signals COM and VOUT and discharges the ink as an example of a liquid by driving the plurality of piezoelectric elements 60, and the drive circuit 50 that outputs the drive signal COM.

2. Configuration of Discharge Unit

Figure 3:
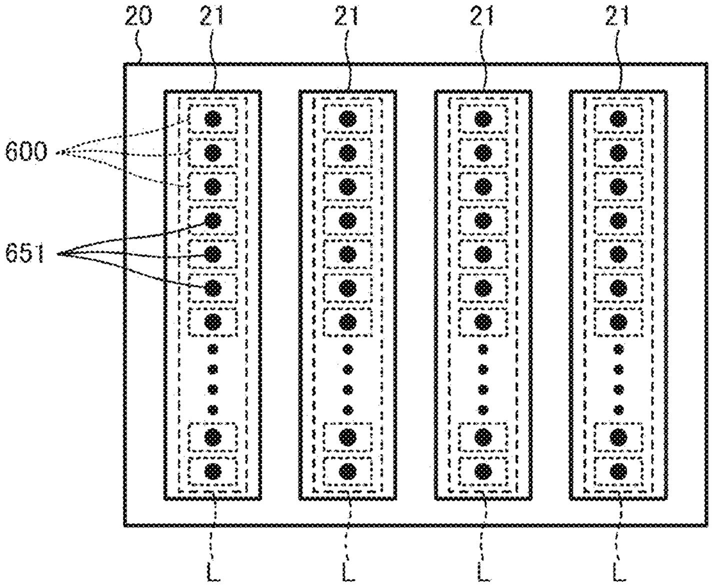
FIG. 3 is a diagram showing an example of an arrangement of a plurality of discharge units in a head unit.

Next, an example of a configuration of each of the plurality of discharge units 600 included in the liquid discharge head 21 and an example of an arrangement of the plurality of discharge units 600 in the head unit 20 will be described. FIG. 3 is a diagram showing an example of the arrangement of the plurality of discharge units 600 in the head unit 20. FIG. 3 shows a case where the head unit 20 includes four liquid discharge heads 21.

As shown in FIG. 3, the four liquid discharge heads 21 each include a plurality of discharge units 600 provided in a row in one direction. That is, the liquid discharge head 21 includes a nozzle row L in which nozzles 651 to be described later included in the discharge unit 600 are arranged in one direction. The liquid discharge heads 21 are located in parallel in the head unit 20 in a direction intersecting the nozzle row L. That is, the same number of nozzle rows L as the liquid discharge heads 21 are formed in the head unit 20. The arrangement of the nozzles 651 in the nozzle row L is not limited to one row. For example, the nozzles 651 may be arranged in a staggered manner such that a position of the even-numbered nozzle 651 counting from one end of the plurality of nozzles 651 and a position of the odd-numbered nozzle counting from the one end of the plurality of nozzles 651 are different, or the plurality of nozzles 651 may be arranged in two or more rows to form one nozzle row L.

Figure 4:
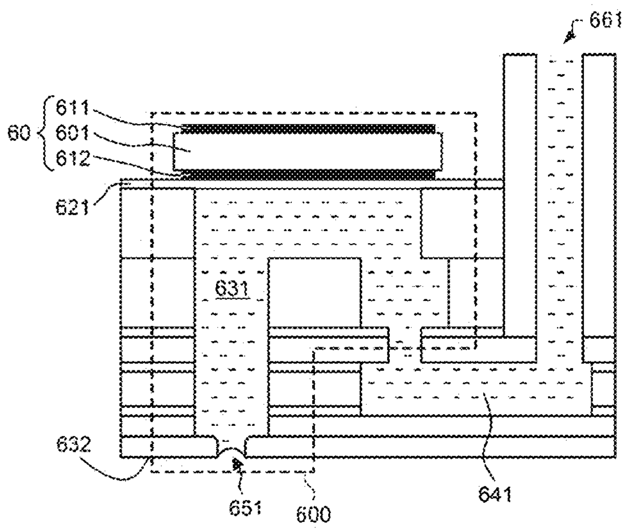
FIG. 4 is a diagram showing an example of a configuration of the discharge unit.

Next, an example of the configuration of the discharge unit 600 will be described. FIG. 4 is a diagram showing an example of the configuration of the discharge unit 600. As shown in FIG. 4, the discharge unit 600 includes the piezoelectric element 60, a vibration plate 621, a cavity 631, and the nozzle 651. The vibration plate 621 is displaced as the piezoelectric element 60 provided on an upper surface in FIG. 4 is driven. The vibration plate 621 functions as a diaphragm that increases and reduces an internal volume of the cavity 631. An inside of the cavity 631 is filled with the ink. The cavity 631 functions as a pressure chamber whose internal volume changes due to the displacement of the vibration plate 621 caused by the driving of the piezoelectric element 60. The nozzle 651 is an opening provided in a nozzle plate 632 and communicating with the cavity 631. As the internal volume of the cavity 631 changes, the ink stored inside the cavity 631 is discharged from the nozzle 651.

The piezoelectric element 60 has a structure in which a piezoelectric body 601 is sandwiched between a pair of electrodes 611, 612. In the piezoelectric body 601 having this structure, central portions of the electrodes 611, 612 and the vibration plate 621 bend in an up-down direction in FIG. 4 with respect to both end portions according to a potential difference between the electrode 611 and the electrode 612.

Specifically, the drive signal VOUT is supplied to the electrode 611 which is one end of the piezoelectric element 60, and the reference voltage signal VBS is supplied to the electrode 612 which is the other end of the piezoelectric element 60. When the piezoelectric element 60 is driven upward according to a change in the voltage of the drive signal VOUT, the vibration plate 621 is displaced upward. As a result, the internal volume of the cavity 631 is increased. Therefore, the ink stored in a reservoir 641 is drawn into the cavity 631. On the other hand, when the piezoelectric element 60 is driven downward according to a change in the voltage value of the drive signal VOUT, the vibration plate 621 is displaced downward. As a result, the internal volume of the cavity 631 is reduced. Therefore, an amount of ink corresponding to a degree of reduction in the internal volume of the cavity 631 is discharged from the nozzle 651.

As described above, the liquid discharge head 21 includes the piezoelectric element 60 and discharges the ink onto the medium P by driving the piezoelectric element 60. The discharge unit 600 and the piezoelectric element 60 included in the discharge unit 600 are not limited to the shown configuration, and may have a structure in which the piezoelectric element 60 is driven based on the drive signal VOUT and the ink can be discharged from the corresponding nozzle 651 by driving the piezoelectric element 60.

3. Configuration and Operation of Drive Circuit

Next, the configuration and the operation of the drive circuit 50 will be described.

3.1 Signal Waveform of Drive Signal COM

Figure 5:
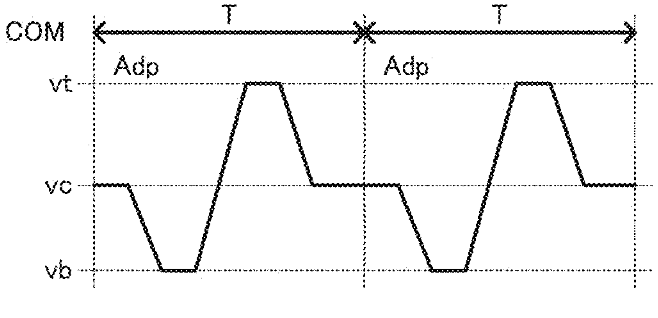
FIG. 5 is a diagram showing an example of a signal waveform of a drive signal.

In describing the configuration and the operation of the drive circuit 50, first, an example of the signal waveform of the drive signal COM output by the drive circuit 50 will be described. FIG. 5 is a diagram showing an example of the signal waveform of the drive signal COM. As shown in FIG. 5, the drive signal COM includes a trapezoidal waveform Adp for each period T. The trapezoidal waveform Adp includes a constant period during which the voltage value is a voltage vc, a constant period during which the voltage value is a voltage vb lower than the voltage vc after the constant period during which the voltage value is the voltage vc, a constant period during which the voltage value is a voltage vt higher than the voltage vc after the constant period during which the voltage value is the voltage vb, and a constant period during which the voltage value is the voltage vc after the constant period during which the voltage value is the voltage vt. That is, the drive signal COM has a voltage value that changes between the voltage vt and the voltage vb, and includes the trapezoidal waveform Adp that starts at the voltage vc and ends at the voltage vc during the period T.

The voltage vc corresponds to a potential serving as a reference for the displacement of the piezoelectric element 60. When the voltage value of the drive signal COM supplied to the piezoelectric element 60 changes from the voltage vc to the voltage vb, the piezoelectric element 60 is driven upward as shown in FIG. 4. As a result, the vibration plate 621 is displaced upward as shown in FIG. 4. Then, when the vibration plate 621 is displaced upward as shown in FIG. 4, the internal volume of the cavity 631 is increased, and the ink stored in the reservoir 641 is drawn into the cavity 631. Subsequently, when the voltage value of the drive signal COM supplied to the piezoelectric element 60 changes from the voltage vb to the voltage vt, the piezoelectric element 60 is driven downward as shown in FIG. 4. As a result, the vibration plate 621 is displaced downward as shown in FIG. 4. When the vibration plate 621 is displaced downward as shown in FIG. 4, the internal volume of the cavity 631 is reduced, and the ink stored in the cavity 631 is discharged from the nozzle 651.

During a constant period after the ink is discharged from the nozzle 651 by driving the piezoelectric element 60, ink near the nozzle 651 and the vibration plate 621 may continue to vibrate. The constant period during which the voltage value included in the drive signal COM is the voltage vc functions as a period for stopping such a vibration, which is generated in the ink or the vibration plate 621 and does not contribute to the discharge of the ink.

Here, the signal waveform of the drive signal COM shown in FIG. 5 is an example and is not limited thereto, and may include signal waveforms of various shapes depending on the physical properties of the ink discharged by the liquid discharge head 21, a length of the period T of the drive signal COM, a conveyance speed of the medium P, and the like.

3.2 Configuration of Drive Circuit

Figure 6:
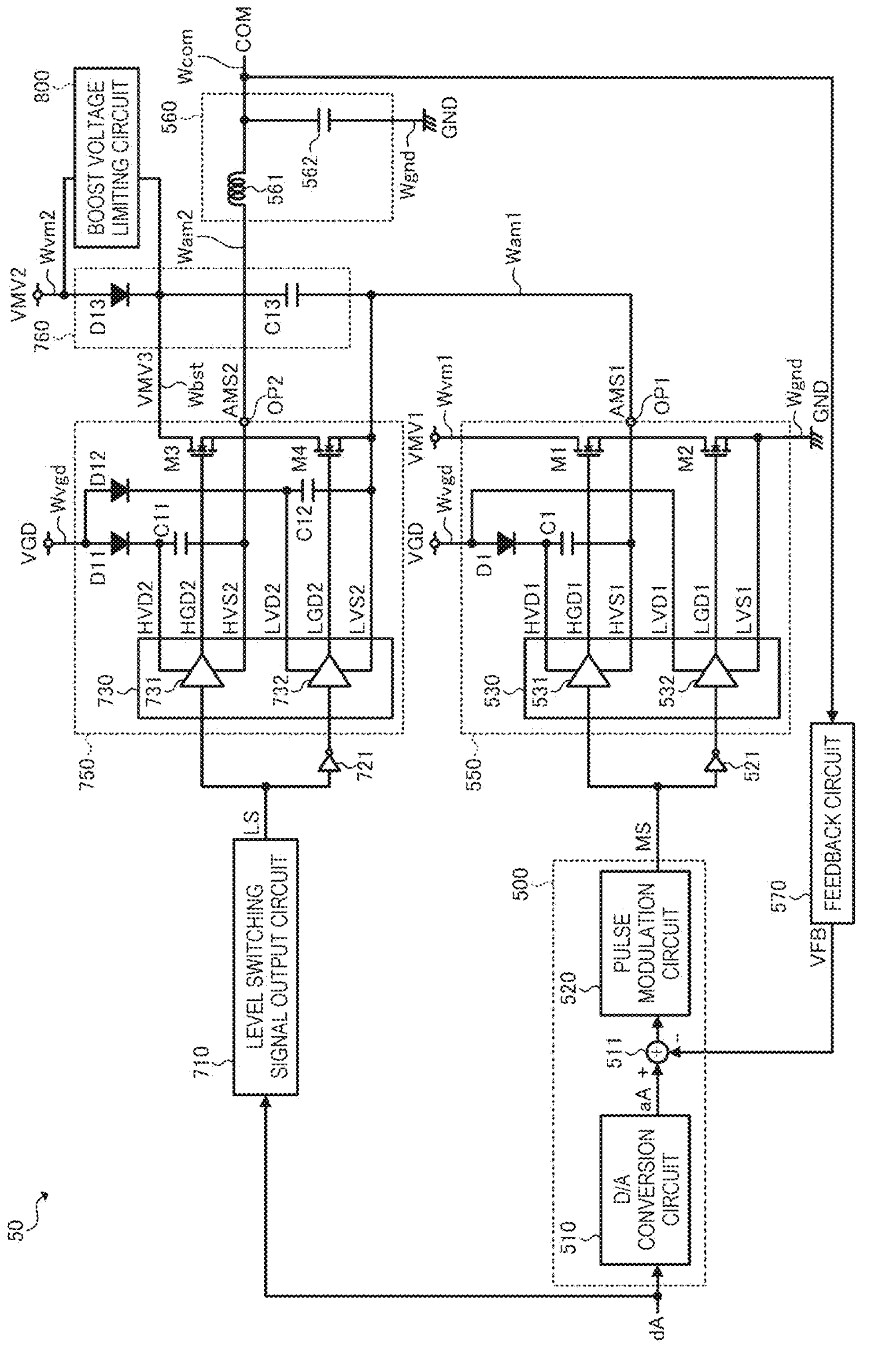
FIG. 6 is a diagram showing an example of a functional configuration of a drive circuit.

Next, the configuration of the drive circuit 50 will be described. FIG. 6 is a diagram showing an example of a functional configuration of the drive circuit 50. As shown in FIG. 6, the drive circuit 50 includes a D/A conversion circuit 510, an adder 511, a pulse modulation circuit 520, an inverter 521, an amplifier circuit 550, a demodulation circuit 560, a feedback circuit 570, a level switching signal output circuit 710, a level shift circuit 750, a boost circuit 760, and a boost voltage limiting circuit 800.

The base drive signal dA, which is a digital signal, is input from the control circuit 100 to the D/A conversion circuit 510. The D/A conversion circuit 510 performs digital-to-analog conversion on the base drive signal dA, and then outputs the analog signal obtained by the conversion as a base drive signal aA. That is, the D/A conversion circuit 510 converts the digital base drive signal dA serving as a basis of the drive signal COM into the analog base drive signal aA. A voltage amplitude of the base drive signal aA is, for example, 1 V to 2 V. The drive circuit 50 outputs, as the drive signal COM, a signal obtained by amplifying the base drive signal aA. That is, the base drive signal aA corresponds to a target signal of the amplification of the drive signal COM.

The base drive signal aA is input to a positive side input terminal of the adder 511. A feedback signal VFB obtained by feeding back the drive signal COM via the feedback circuit 570 to be described later is input to a negative side input terminal of the adder 511. The adder 511 outputs a signal obtained by subtracting the feedback signal VFB from the base drive signal aA to the pulse modulation circuit 520.

The pulse modulation circuit 520 performs pulse modulation on the signal output by the adder 511 to generate a modulation signal MS. That is, the pulse modulation circuit 520 outputs the modulation signal MS obtained by modulating the analog base drive signal aA. The modulation signal MS is a digital signal including a potential at an L level and a potential at an H level higher than the L level. Then, the pulse modulation circuit 520 outputs the generated modulation signal MS to the amplifier circuit 550. Such a pulse modulation circuit 520 generates a pulse density modulation signal (PDM signal) obtained by modulating the signal output by the adder 511 with a pulse density modulation (PDM) method, and outputs the PDM signal to the amplifier circuit 550 as the modulation signal MS. Specifically, the pulse modulation circuit 520 compares a voltage value of the output signal of the adder 511 with a reference voltage vref that is a predetermined voltage value. The, the pulse modulation circuit 520 outputs the modulation signal MS at the H level if the voltage value of the output signal of the adder 511 is larger than the reference voltage vref, and outputs the modulation signal MS at the L level if the voltage value of the output signal of the adder 511 is less than the reference voltage vref.

The amplifier circuit 550 includes a gate drive circuit 530, a diode D1, a capacitor C1, and transistors M1, M2. The amplifier circuit 550 generates a first amplified modulation signal AMS1 obtained by amplifying the modulation signal MS, and outputs the first amplified modulation signal AMS1 from a first output point OP1.

The gate drive circuit 530 outputs a gate signal HGD1 and a gate signal LGD1 based on the modulation signal MS. Specifically, the modulation signal MS is input to a gate driver 531 included in the gate drive circuit 530. The gate driver 531 generates the gate signal HGD1 obtained by level-shifting the modulation signal MS, and outputs the gate signal HGD1 to the transistor M1. The modulation signal MS is inverted in its logic level by the inverter 521 and is then input to a gate driver 532 included in the gate drive circuit 530. The gate driver 532 generates the gate signal LGD1 obtained by level-shifting the signal in which the logic level of the modulation signal MS is inverted, and outputs the gate signal LGD1 to the transistor M2.

The transistors M1, M2 are both implemented as N-channel MOSFETs. The transistor M1 includes a source terminal electrically coupled to the first output point OP1 and a drain terminal supplied with the voltage vmv1 of the voltage signal VMV1 as a power supply voltage via a wiring Wvm1, and operates based on the gate signal HGD1 input to a gate terminal. The transistor M2 includes a drain terminal electrically coupled to the first output point OP1 and a source terminal supplied with a ground signal GND that is a ground potential gnd of 0 V via a wiring Wgnd, and operates based on the gate signal LGD1 input to a gate terminal.

The transistor M1 operates based on the gate signal HGD1, and the transistor M2 operates based on the gate signal LGD1, thereby generating the first amplified modulation signal AMS1 obtained by amplifying the modulation signal MS, based on the ground potential gnd and the voltage vmv1, at the first output point OP1. That is, the amplifier circuit 550 outputs the first amplified modulation signal AMS1 obtained by amplifying the modulation signal MS, based on the ground potential gnd and the voltage vmv1.

Here, an operation of the gate drive circuit 530 will be described. The gate drive circuit 530 includes the gate drivers 531, 532. As described above, the modulation signal MS is input to the gate driver 531, and the signal obtained by inverting the logic level of the modulation signal MS by the inverter 521 is input to the gate driver 532. That is, a signal input to the gate driver 531 and a signal input to the gate driver 532 are exclusively at the H level. Here, being exclusively at the H level includes a case where a signal at the H level is not input to the gate driver 531 and the gate driver 532 at the same time. That is, a case where a signal at the L level is input to the gate driver 531 and the gate driver 532 at the same time is not excluded.

A power supply terminal at a low potential side of the gate driver 531 is electrically coupled to the first output point OP1. Therefore, the power supply terminal at the low potential side of the gate driver 531 is supplied with a signal generated at the first output point OP1 as a voltage signal HVS1. A power supply terminal at a high potential side of the gate driver 531 is electrically coupled to a cathode terminal of the diode D1 and one end of the capacitor C1. An anode terminal of the diode D1 is supplied with the voltage signal VGD via a wiring Wvgd, and the other end of the capacitor C1 is electrically coupled to the first output point OP1. That is, the diode D1 and the capacitor C1 form a bootstrap circuit, and an output voltage of the bootstrap circuit is supplied to the power supply terminal at the high potential side of the gate driver 531. Therefore, the voltage signal HVD1 having a voltage value that is higher than a voltage value of the voltage signal HVS1 input to the power supply terminal on the low potential side of the gate driver 531 by the voltage vgd, which is the voltage value of the voltage signal VGD, is supplied to the power supply terminal on the high potential side of the gate driver 531.

Therefore, the gate driver 531 outputs the gate signal HGD1 having a voltage value based on the voltage signal HVD1 having the voltage value higher than a voltage value at the first output point OP1 by the voltage vgd when the modulation signal MS at the H level is input, and outputs the gate signal HGD1 having a voltage value based on the voltage value of the voltage signal HVS1, which is the voltage value at the first output point OP1, when the modulation signal MS at the L level is input.

Here, the voltage vgd may be a voltage value capable of driving the transistors M1, M2 and transistors M3, M4 to be described later, and is not limited to a DC voltage of 7.5 V.

A power supply terminal at a low potential side of the gate driver 532 is supplied with the ground signal GND of the ground potential gnd as a voltage signal LVS1. A power supply terminal at a high potential side of the gate driver 532 is supplied with the voltage signal VGD as a voltage signal LVD1. Therefore, the gate driver 532 outputs the gate signal LGD1 having a voltage value based on the voltage signal LVD1 having a voltage value of the voltage vm when receiving a signal at the H level obtained by inverting the logic level of the modulation signal MS at the L level by the inverter 521, and outputs the gate signal LGD1 having a voltage value based on the voltage signal LVS1 having a voltage value of the ground potential gnd when receiving a signal at the L level obtained by inverting the logic level of the modulation signal MS at the H level by the inverter 521.

The level switching signal output circuit 710 receives the base drive signal dA and generates a level switching signal LS based on the base drive signal dA. The level switching signal LS is a digital signal including a potential at the L level and a potential at the H level higher than the L level. Specifically, the level switching signal output circuit 710 outputs the level switching signal LS at the H level when a value of the base drive signal dA is larger than a predetermined threshold, and outputs the level switching signal LS at the L level when the value of the base drive signal dA is less than the predetermined threshold. That is, the level switching signal output circuit 710 outputs the level switching signal LS based on the base drive signal dA.

The level shift circuit 750 includes a gate drive circuit 730, diodes D11, D12, capacitors C11, C12, and the transistors M3, M4. The level shift circuit 750 outputs a signal, obtained by level-shifting the first amplified modulation signal AMS1 or a reference potential of the first amplified modulation signal AMS1, to a second output point OP2 as a second amplified modulation signal AMS2.

The gate drive circuit 730 outputs a gate signal HGD2 and a gate signal LGD2 based on the level switching signal LS. Specifically, the level switching signal LS is input to a gate driver 731 included in the gate drive circuit 730. The gate driver 731 generates the gate signal HGD2 obtained by level-shifting the level switching signal LS, and outputs the gate signal HGD2 to the transistor M3. A logic level of the level switching signal LS is inverted in an inverter 721, and then the level switching signal LS is input to a gate driver 732 included in the gate drive circuit 730. The gate driver 732 generates the gate signal LGD2 obtained by level-shifting a signal obtained by inverting the logic level of the level switching signal LS, and outputs the gate signal LGD2 to the transistor M4.

The transistors M3, M4 are both implemented as N-channel MOSFETS. The transistor M3 includes a source terminal electrically coupled to the second output point OP2 and a drain terminal supplied with a power supply voltage via a wiring Wbst, and operates based on the gate signal HGD2 input to a gate terminal. The transistor M4 includes a drain terminal electrically coupled to the second output point OP2 and a source terminal supplied with the first amplified modulation signal AMS1 via a wiring Wam1, and operates based on the gate signal LGD2 input to a gate terminal.

The transistor M3 operates based on the gate signal HGD2, and the transistor M4 operates based on the gate signal LGD2, thereby generating a signal, which is obtained by level-shifting the first amplified modulation signal AMS1 or the reference potential of the first amplified modulation signal AMS1 according to the power supply voltage supplied to the drain terminal of the transistor M3, as the second amplified modulation signal AMS2 at the second output point OP2. That is, the level shift circuit 750 selects, according to the level switching signal LS, a signal obtained by shifting the reference potential of the first amplified modulation signal AMS1 to the power supply voltage input via the wiring Wbst or a signal obtained by not shifting the reference potential of the first amplified modulation signal AMS1, and outputs the selected signal as the second amplified modulation signal AMS2.

Here, the power supply voltage supplied to the drain terminal of the transistor M3 is supplied from the boost circuit 760 via the wiring Wbst. The boost circuit 760 includes a diode D13 and a capacitor C13. In the capacitor C13, one end is electrically coupled to the first output point OP1 via the wiring Wam1, the first amplified modulation signal AMS1 is supplied to the one end, and the other end is electrically coupled to the wiring Wbst for supplying the power supply voltage to the drain terminal of the transistor M3. The voltage signal VMV2 is supplied to an anode terminal of the diode D13 via a wiring Wvm2, and a cathode terminal of the diode D13 is electrically coupled to the other end of the capacitor C13 and the wiring Wbst. The boost circuit 760 outputs a signal of the wiring Wbst at a coupling point at which the other end of the capacitor C13 and the cathode terminal of the diode D13 are coupled, as a voltage signal VMV3. The voltage signal VMV3 output by the boost circuit 760 is supplied to the drain terminal of the transistor M3 as the power supply voltage of the transistor M3. That is, the boost circuit 760 includes the capacitor C13 having the one end electrically coupled to the wiring Wam1 and the other end electrically coupled to the wiring Wbst, and the diode D13 having the anode terminal electrically coupled to the wiring Wvm2 and the cathode terminal electrically coupled to the wiring Wam1.

In the boost circuit 760 having the configuration as described above, a charge corresponding to the voltage vmv2, which is the voltage value of the voltage signal VMV2, is stored in the capacitor C13. According to the charge stored in the capacitor C13, the boost circuit 760 outputs, as the voltage signal VMV3, a signal obtained by adding a voltage value of the first amplified modulation signal AMS1 to a voltage value corresponding to the voltage vmv2, which is a voltage value between both ends of the capacitor C13, to the drain terminal of the transistor M3. Here, the voltage value between both ends of the capacitor C13 is accurately a value obtained by subtracting a forward voltage of the diode D13 from the voltage vmv2, which is the voltage value of the voltage signal VMV2. In the embodiment, a description will be made assuming that the voltage value between both ends of the capacitor C13 is equal to the voltage vmv2, which is the voltage value of the voltage signal VMV2, supplied to the boost circuit 760. That is, the boost circuit 760 is electrically coupled to the wiring Wam1 and the wiring Wvm2 through which the voltage signal VMV2 having a voltage value of the voltage vmv2 propagates, and outputs the voltage signal VMV3 to the wiring Wbst.

The boost voltage limiting circuit 800 is electrically coupled to the wiring Wvm2 through which the voltage signal VMV2 propagates and the wiring Wbst through which the voltage signal VMV3 propagates. The boost voltage limiting circuit 800 limits the voltage value of the voltage signal VMV3 output from the boost circuit 760, based on the voltage vmv2, which is the voltage value of the voltage signal VMV2. Details of a configuration and an operation of the boost voltage limiting circuit 800 will be described later.

Here, an operation of the gate drive circuit 730 will be described. The gate drive circuit 730 includes the gate drivers 731, 732. As described above, the level switching signal LS is input to the gate driver 731, and the signal obtained by inverting the logic level of the level switching signal LS by the inverter 721 is input to the gate driver 732. That is, a signal input to the gate driver 731 and a signal input to the gate driver 732 are exclusively at the H level. Here, being exclusively at the H level includes a case where a signal at the H level is not input to the gate driver 731 and the gate driver 732 at the same time. That is, a case where a signal at the L level is input to the gate driver 731 and the gate driver 732 at the same time is not excluded.

A power supply terminal at a low potential side of the gate driver 731 is electrically coupled to the second output point OP2. Therefore, the power supply terminal at the low potential side of the gate driver 731 is supplied with a signal generated at the second output point OP2 as a voltage signal HVS2. A power supply terminal at a high potential side of the gate driver 731 is electrically coupled to a cathode terminal of the diode D11 and one end of the capacitor C11. An anode terminal of the diode D11 is supplied with the voltage signal VGD via the wiring Wvgd, and the other end of the capacitor C11 is electrically coupled to the second output point OP2. That is, the diode D11 and the capacitor C11 form a bootstrap circuit, and an output voltage of the bootstrap circuit is supplied to the power supply terminal at the high potential side of the gate driver 731. Therefore, a voltage signal HVD2 having a voltage value that is higher than a voltage value of the voltage signal HVS2 input to the power supply terminal on the low potential side of the gate driver 731 by the voltage vgd, which is the voltage value of the voltage signal VGD, is supplied to the power supply terminal on the high potential side of the gate driver 731.

The gate driver 731 outputs the gate signal HGD2 having a voltage value based on the voltage signal HVD2 having a voltage value higher than the voltage value at the second output point OP2 by the voltage vgd when receiving the level switching signal LS at the H level, and outputs the gate signal HGD2 based on the voltage value of the voltage signal HVS2, which is the voltage value at the second output point OP2, when receiving the level switching signal LS at the L level.

A power supply terminal at a low potential side of the gate driver 732 is electrically coupled to the first output point OP1 via the wiring Wam1. Therefore, the power supply terminal at the low potential side of the gate driver 732 is supplied with the first amplified modulation signal AMS1 generated at the first output point OP1, as a voltage signal LVS2. A power supply terminal at a high potential side of the gate driver 732 is electrically coupled to a cathode terminal of the diode D12 and one end of the capacitor C12. The voltage signal VGD is supplied to an anode terminal of the diode D12 via the wiring Wvgd, and the other end of the capacitor C12 is electrically coupled to the first output point OP1 via the wiring Wam1. That is, the diode D12 and the capacitor C12 form a bootstrap circuit, and an output voltage of the bootstrap circuit is supplied to the power supply terminal at the high potential side of the gate driver 732. Therefore, a voltage signal LVD2 having a voltage value that is higher than a voltage value of the voltage signal LVS2 input to the power supply terminal on the low potential side of the gate driver 732 by the voltage vgd, which is the voltage value of the voltage signal VGD, is supplied to the power supply terminal on the high potential side of the gate driver 732.

Therefore, the gate driver 732 outputs the gate signal LGD2 having a voltage value based on the voltage signal LVD2 having a voltage value higher than the voltage value at the first output point OP1 by the voltage vgd when receiving a signal at the H level obtained by inverting the logic level of the level switching signal LS at the L level by the inverter 721, and outputs the gate signal HGD2 based on the voltage value of the voltage signal LVS2, which is the voltage value at the first output point OP1, when receiving a signal at the L level obtained by inverting the logic level of the level switching signal LS at the H level by the inverter 721.

When the level switching signal LS at the L level output by the level switching signal output circuit 710 is input to the level shift circuit 750 having the configuration as described above, the first output point OP1 of the amplifier circuit 550 and the second output point OP2 of the level shift circuit 750 are electrically coupled via the transistor M4. Therefore, when the level switching signal LS at the L level is input, the level shift circuit 750 outputs, as the second amplified modulation signal AMS2, the first amplified modulation signal AMS1 supplied to the second output point OP2 via the transistor M4.

In contrast, when the level switching signal LS at the H level output by the level switching signal output circuit 710 is input to the level shift circuit 750, the first output point OP1 of the amplifier circuit 550 and the second output point OP2 of the level shift circuit 750 are electrically coupled via the boost circuit 760 and the transistor M3. Therefore, when the level switching signal LS at the H level is input, the level shift circuit 750 outputs, as the second amplified modulation signal AMS2, the voltage signal VMV3, which is a signal obtained by level-shifting the reference potential of the first amplified modulation signal AMS1 by the voltage vmv2, which is the voltage value of the voltage signal VMV2.

In the following description, an operation mode in which the level shift circuit 750 outputs the first amplified modulation signal AMS1 as the second amplified modulation signal AMS2 is referred to as a first mode MD1, and an operation mode in which the level shift circuit 750 outputs a signal obtained by level-shifting a potential of the first amplified modulation signal AMS1 as the second amplified modulation signal AMS2 is referred to as a second mode MD2. That is, the level shift circuit 750 is in the first mode MD1 when the level switching signal LS is at the L level, and is in the second mode MD2 when the level switching signal LS is at the H level.

As described above, when the value of the base drive signal dA is less than the predetermined threshold, the level switching signal output circuit 710 outputs the level switching signal LS at the L level. Therefore, when the value of the base drive signal dA is less than the predetermined threshold, the operation mode of the level shift circuit 750 is the first mode MD1. Subsequently, when the value of the base drive signal dA becomes larger than the predetermined threshold, the level switching signal output circuit 710 switches the level switching signal LS from the L level to the H level. Accordingly, the operation mode of the level shift circuit 750 is switched from the first mode MD1 to the second mode MD2. Immediately after switching the logic level of the level switching signal LS from the L level to the H level, the level switching signal output circuit 710 outputs, once or a plurality of times, a pulse signal in which the logic level of the level switching signal LS to be output is at the L level for a short period of time to reduce a waveform distortion of the drive signal COM that may occur due to the switching of the operation mode of the level shift circuit 750.

On the other hand, when the value of the base drive signal dA is larger than the predetermined threshold, the level switching signal output circuit 710 outputs the level switching signal LS at the H level. Therefore, the operation mode of the level shift circuit 750 is the second mode MD2. Subsequently, when the value of the base drive signal dA becomes less than the predetermined threshold, the level switching signal output circuit 710 switches the level switching signal LS from the H level to the L level. Accordingly, the operation mode of the level shift circuit 750 is switched from the second mode MD2 to the first mode MD1. Immediately after switching the logic level of the level switching signal LS from the H level to the L level, the level switching signal output circuit 710 outputs, once or a plurality of times, a pulse signal in which the logic level of the level switching signal LS to be output is at the H level for a short period of time to reduce a waveform distortion of the drive signal COM that may occur due to the switching of the operation mode of the level shift circuit 750.

Here, in the following description, the pulse signal that is at the L level for a short period of time when the operation mode of the level shift circuit 750 is switched from the first mode MD1 to the second mode MD2, and the pulse signal that is at the H level for a short period of time when the operation mode of the level shift circuit 750 is switched from the second mode MD2 to the first mode MD1 may be each referred to as a counter pulse CP.

The second amplified modulation signal AMS2 output by the level shift circuit 750 propagates through a wiring Wam2 and is input to the demodulation circuit 560. The demodulation circuit 560 smooths and demodulates the second amplified modulation signal AMS2 output by the level shift circuit 750 to generate the drive signal COM. The drive signal COM thus generated by the demodulation circuit 560 propagates through a wiring Wcom and is output from the drive circuit 50.

The demodulation circuit 560 includes an inductor 561 and a capacitor 562. One end of the inductor 561 is electrically coupled to the second output point OP2 via the wiring Wam2. The other end of the inductor 561 is electrically coupled to one end of the capacitor 562 via the wiring Wcom. The ground signal GND of the ground potential gnd propagating through the wiring Wgnd is supplied to the other end of the capacitor 562. That is, the inductor 561 and the capacitor 562 form a low-pass filter circuit. The second amplified modulation signal AMS2 output from the level shift circuit 750 is smoothed by the low-pass filter circuit. A signal obtained by smoothing the second amplified modulation signal AMS2 by the demodulation circuit 560 propagates through the wiring Wcom as the drive signal COM and is output from the drive circuit 50.

The feedback circuit 570 receives the drive signal COM generated by the demodulation circuit 560 and outputs the feedback signal VFB to the adder 511. Specifically, the feedback circuit 570 supplies the feedback signal VFB obtained by voltage-dividing the drive signal COM to the adder 511. Accordingly, the drive signal COM is fed back to the pulse modulation circuit 520. As a result, the waveform accuracy of the drive signal COM output by the drive circuit 50 is improved. Here, the feedback circuit 570 may feedback, as the feedback signal VFB, a plurality of signals including a signal obtained by voltage-dividing the drive signal COM and a signal obtained by extracting a high-frequency component of the drive signal COM. That is, the feedback circuit 570 may include a plurality of feedback circuits including a circuit for feeding back the signal obtained by voltage-dividing the drive signal COM and a circuit for feeding back the signal obtained by extracting the high-frequency component of the drive signal COM. Accordingly, the high-frequency components included in the drive signal COM can be fed back individually. As a result, it is possible for the drive circuit 50 to self-oscillate based on the high-frequency component, and a frequency of the modulation signal MS can be made high enough to ensure the accuracy of the drive signal COM. Therefore, the waveform accuracy of the drive signal COM output from the drive circuit 50 is further improved.

As described above, the drive circuit 50 according to the embodiment is a capacitive load drive circuit that outputs the drive signal COM for driving the piezoelectric element 60, which is a capacitive load, and includes the amplifier circuit 550 that is electrically coupled to the wiring Wgnd through which the ground signal GND of the ground potential gnd propagates and the wiring Wvm1 through which the voltage signal VMV1 having the voltage value of the voltage vm1 propagates, and outputs the first amplified modulation signal AMS1 to the wiring Wam1, the boost circuit 760 that is electrically coupled to the wiring Wam1 and the wiring Wvm2 through which the voltage signal VMV2 having a voltage value of the voltage vmv2 propagates, and outputs the voltage signal VMV3 to the wiring Wbst, the level shift circuit 750 that is coupled to the wiring Wam1 and the wiring Wbst, and outputs the second amplified modulation signal AMS2 to the wiring Wam2, the demodulation circuit 560 that smoothes and outputs the second amplified modulation signal AMS2 as the drive signal COM, and the boost voltage limiting circuit 800 that limits the voltage value of the voltage signal VMV3 output from the boost circuit 760 based on the voltage vmv2 that is the voltage value of the voltage signal VMV2.

3.3 Operation of Drive Circuit

Figure 7:
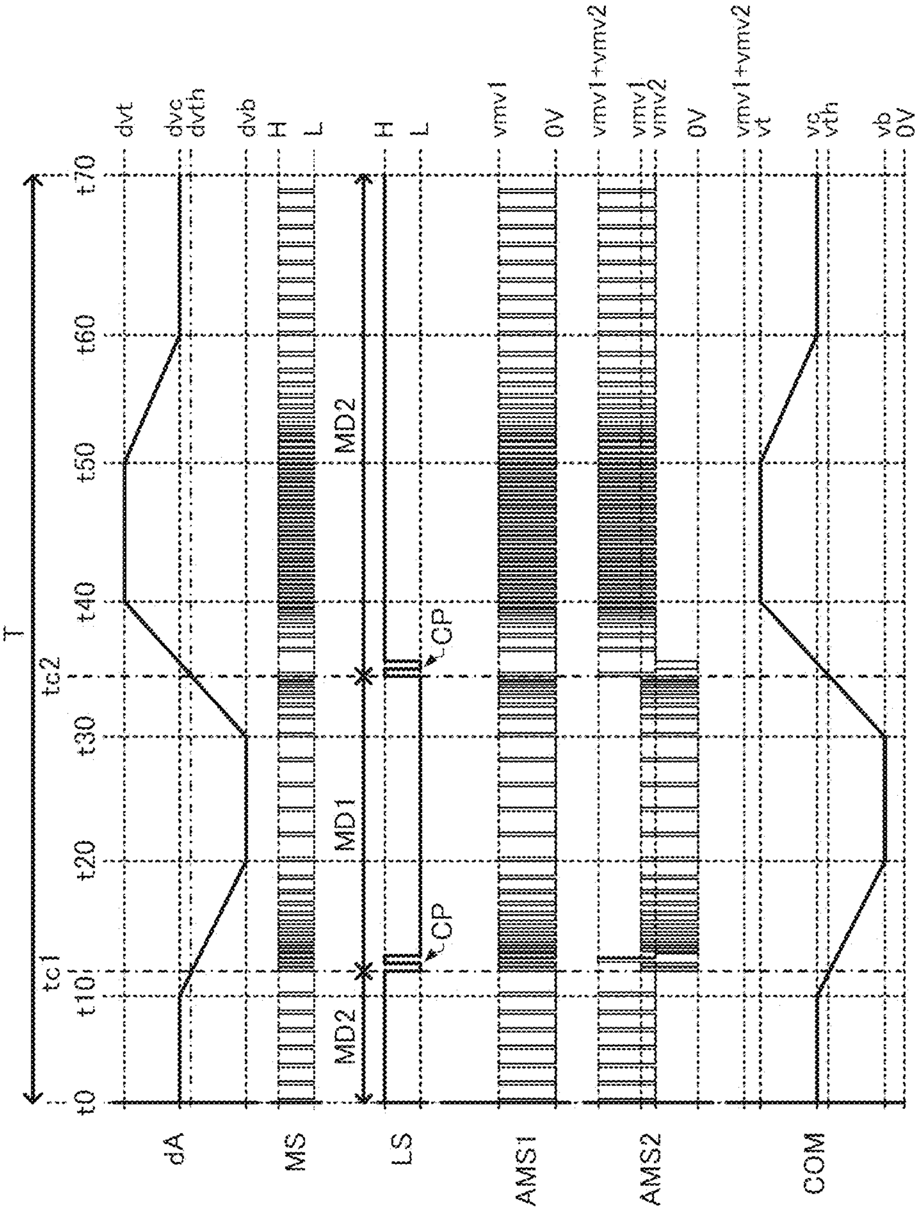
FIG. 7 is a diagram showing an operation of the drive circuit.

Next, the operation of the drive circuit 50 will be described. FIG. 7 is a diagram showing the operation of the drive circuit 50. FIG. 7 shows only the drive signal COM in any period T in the drive signal COM output by the drive circuit 50. For convenience of illustration and description, FIG. 7 shows a signal waveform in an ideal case without a circuit delay or a wiring delay. In FIG. 7, the predetermined threshold of the base drive signal dA for switching the logic level of the level switching signal LS output by the level switching signal output circuit 710 is shown as a threshold dvth, and a voltage value of the drive signal COM corresponding to the threshold dvth is shown as a voltage vth. In FIG. 7, values of the base drive signal dA corresponding to the voltages vt, vb, and vc of the drive signal COM are shown as digital values dvt, dvb, and dvc, respectively. Although FIG. 7 shows a case where the voltage vth is less than the voltage vc and the threshold dvth is less than the digital value dvc, a relationship between the voltage vth and the voltage vc and a relationship between the threshold dvth and the digital value dvc are not limited thereto.

As shown in FIG. 7, during a period from a time point to t0 a time point t10, the base drive signal dA having the digital value dvc is input to the D/A conversion circuit 510. Therefore, the voltage value of the drive signal COM output by the drive circuit 50 is the voltage vc. At this time, the digital value dvc is larger than the threshold dvth. Therefore, the level switching signal output circuit 710 outputs the level switching signal LS at the H level. That is, during the period from the time point to t0 the time point t10, the operation mode of the level shift circuit 750 is the second mode MD2, and the level shift circuit 750 outputs a signal obtained by level-shifting the reference potential of the first amplified modulation signal AMS1 to the voltage vmv2 as the second amplified modulation signal AMS2.

During a period from the time point t10 to a time point t20, the base drive signal dA decreasing from the digital value dvc to the digital value dvb is input to the D/A conversion circuit 510. Therefore, the voltage value of the drive signal COM output by the drive circuit 50 decreases from the voltage vc to the voltage vb. The level switching signal output circuit 710 outputs the level switching signal LS at the H level during a period from the time point t10 to a time point tc1 in which the value of the base drive signal dA is larger than the threshold dvth, in the period from the time point t10 to the time point t20. That is, during the period from the time point t10 to the time point tc1, the operation mode of the level shift circuit 750 is maintained at the second mode MD2, and the level shift circuit 750 outputs the signal obtained by level-shifting the reference potential of the first amplified modulation signal AMS1 to the voltage vmv2 as the second amplified modulation signal AMS2. In contrast, the level switching signal output circuit 710 outputs the level switching signal LS at the L level during a period from the time point tc1 to the time point t20 in which the value of the base drive signal dA is less than the threshold dvth, in the period from the time point t10 to the time point t20. Accordingly, the operation mode of the level shift circuit 750 transitions to the first mode MD1, and the level shift circuit 750 outputs the first amplified modulation signal AMS1 as the second amplified modulation signal AMS2.

Here, when the operation mode of the level shift circuit 750 transitions from the second mode MD2 to the first mode MD1, the reference potential of the first amplified modulation signal AMS1 output as the second amplified modulation signal AMS2 steeply changes from the voltage vmv2 to the ground potential. If a response speed of the drive circuit 50 cannot keep up with this sudden change in the reference potential, a distortion may occur in the signal waveform of the drive signal COM. In the drive circuit 50 according to the embodiment, to reduce such a distortion of the signal waveform that may occur in the drive signal COM, the level switching signal output circuit 710 outputs, at the time point tc1, the counter pulse CP for inverting the logic level of the level switching signal LS for a short period of time after the operation mode of the level shift circuit 750 transitions from the second mode MD2 to the first mode MD1. By the counter pulse CP, the change in the reference potential of the first amplified modulation signal AMS1 output as the second amplified modulation signal AMS2 becomes gentle, and as a result, the possibility that a distortion occurs in the signal waveform of the drive signal COM is reduced.

During a period from the time point t20 to a time point t30, the base drive signal dA having the digital value dvb is input to the D/A conversion circuit 510. Therefore, the voltage value of the drive signal COM output by the drive circuit 50 is the voltage vb. At this time, the digital value dvb is less than the threshold dvth. Therefore, the level switching signal output circuit 710 outputs the level switching signal LS at the L level. That is, during the period from the time point t20 to the time point t30, the operation mode of the level shift circuit 750 is maintained at the first mode MD1, and the level shift circuit 750 outputs the first amplified modulation signal AMS1 as the second amplified modulation signal AMS2.

During a period from the time point t30 to a time point t40, the base drive signal dA increasing from the digital value dvb to the digital value dvt is input to the D/A conversion circuit 510. Therefore, the voltage value of the drive signal COM output by the drive circuit 50 increases from the voltage vb to the voltage vt. The level switching signal output circuit 710 outputs the level switching signal LS at the L level during a period from the time point t30 to a time point tc2 in which the value of the base drive signal dA is less than the threshold dvth, in the period from the time point t30 to the time point t40. That is, during the period from the time point t30 to the time point tc2, the operation mode of the level shift circuit 750 is maintained at the first mode MD1, and the level shift circuit 750 outputs the first amplified modulation signal AMS1 as the second amplified modulation signal AMS2. In contrast, the level switching signal output circuit 710 outputs the level switching signal LS at the H level during a period from the time point tc2 to the time point t40 in which the value of the base drive signal dA is larger than the threshold dvth, in the period from the time point t30 to the time point t40. Accordingly, the operation mode of the level shift circuit 750 transitions to the second mode MD2, and the level shift circuit 750 outputs the signal obtained by level-shifting the reference potential of the first amplified modulation signal AMS1 to the voltage vmv2 as the second amplified modulation signal AMS2.

Here, when the operation mode of the level shift circuit 750 transitions from the second mode MD2 to the first mode MD1, the reference potential of the first amplified modulation signal AMS1 output as the second amplified modulation signal AMS2 steeply changes from the ground potential to the voltage vmv2. If a response speed of the drive circuit 50 cannot keep up with this sudden change in the reference potential, a distortion may occur in the signal waveform of the drive signal COM. In the drive circuit 50 according to the embodiment, to reduce such a distortion of the signal waveform that may occur in the drive signal COM, the level switching signal output circuit 710 outputs, at the time point tc2, the counter pulse CP for inverting the logic level of the level switching signal LS for a short period of time after the operation mode of the level shift circuit 750 transitions from the first mode MD1 to the second mode MD2. By the counter pulse CP, the change in the reference potential of the first amplified modulation signal AMS1 output as the second amplified modulation signal AMS2 becomes gentle, and as a result, the possibility that a distortion occurs in the signal waveform of the drive signal COM is reduced.

During a period from the time point t40 to a time point t50, the base drive signal dA having the digital value dvt is input to the D/A conversion circuit 510. Therefore, the voltage value of the drive signal COM output by the drive circuit 50 is the voltage vt. At this time, the digital value dvt is larger than the threshold dvth. Therefore, the level switching signal output circuit 710 outputs the level switching signal LS at the H level. That is, during the period from the time point t40 to the time point t50, the operation mode of the level shift circuit 750 maintains the second mode MD2, and the level shift circuit 750 outputs the signal obtained by level-shifting the reference potential of the first amplified modulation signal AMS1 to the voltage vmv2 as the second amplified modulation signal AMS2.

During a period from the time point t50 to a time point t60, the base drive signal dA decreasing from the digital value dvt to the digital value dvc is input to the D/A conversion circuit 510. Therefore, the voltage value of the drive signal COM output by the drive circuit 50 decreases from the voltage vt to the voltage vc. At this time, the value of the base drive signal dA is larger than the threshold dvth. Therefore, the level switching signal output circuit 710 outputs the level switching signal LS at the H level. That is, during the period from the time point t50 to the time point t60, the operation mode of the level shift circuit 750 is maintained at the second mode MD2, and the level shift circuit 750 outputs the signal obtained by level-shifting the reference potential of the first amplified modulation signal AMS1 to the voltage vmv2 as the second amplified modulation signal AMS2.

During a period from the time point t60 to a time point t70, the base drive signal dA having the digital value dvc is input to the D/A conversion circuit 510. Therefore, the voltage value of the drive signal COM output by the drive circuit 50 is the voltage vc. At this time, the digital value dvc is larger than the threshold dvth. Therefore, the level switching signal output circuit 710 outputs the level switching signal LS at the H level. That is, during the period from the time point t60 to the time point t70, the operation mode of the level shift circuit 750 is maintained at the second mode MD2, and the level shift circuit 750 outputs the signal obtained by level-shifting the reference potential of the first amplified modulation signal AMS1 to the voltage vmv2 as the second amplified modulation signal AMS2.

3.4 Configuration and Operation of Boost Voltage Limiting Circuit

In the drive circuit 50 having the configuration as described above, an amount of charge accumulated in the capacitor C13 included in the boost circuit 760 fluctuates according to the signal waveform of the drive signal COM to be output and the number of piezoelectric elements 60 driven by the drive signal COM. As a result, the voltage value between both ends of the capacitor C13 may fluctuate.

Such a fluctuation in the voltage value between both ends of the capacitor C13 may distort a signal waveform of the voltage signal VMV3 output by the boost circuit 760 and the signal waveform of the drive signal COM output by the drive circuit 50. As a result, the discharge accuracy of the ink discharged from the discharge unit 600 may deteriorate. Further, when the fluctuation in the voltage value between both ends of the capacitor C13 exceeds a withstand voltage of various electronic components forming the drive circuit 50, the electronic components may fail. The boost voltage limiting circuit 800 included in the drive circuit 50 according to the embodiment limits such a fluctuation in the voltage value between both ends of the capacitor C13, that is, a fluctuation in the voltage value of the voltage signal VMV3 output by the boost circuit 760, thereby reducing the possibility that a distortion occurs in the signal waveform of the drive signal COM output by the drive circuit 50 and reducing the possibility that the discharge accuracy of the ink discharged from the discharge unit 600 deteriorates.

Figure 8:
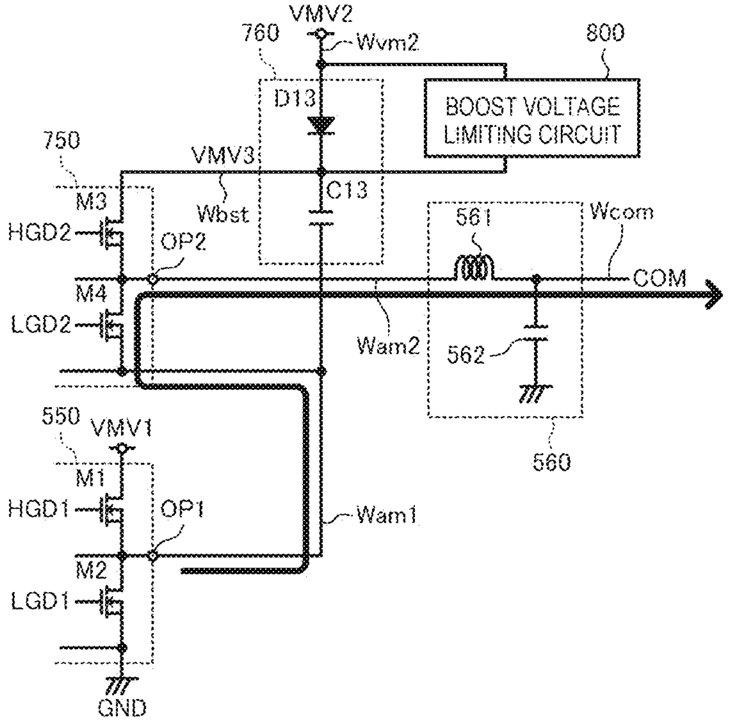
FIG. 8 is a diagram showing an outline of a current flowing through the drive circuit.
Figure 9:
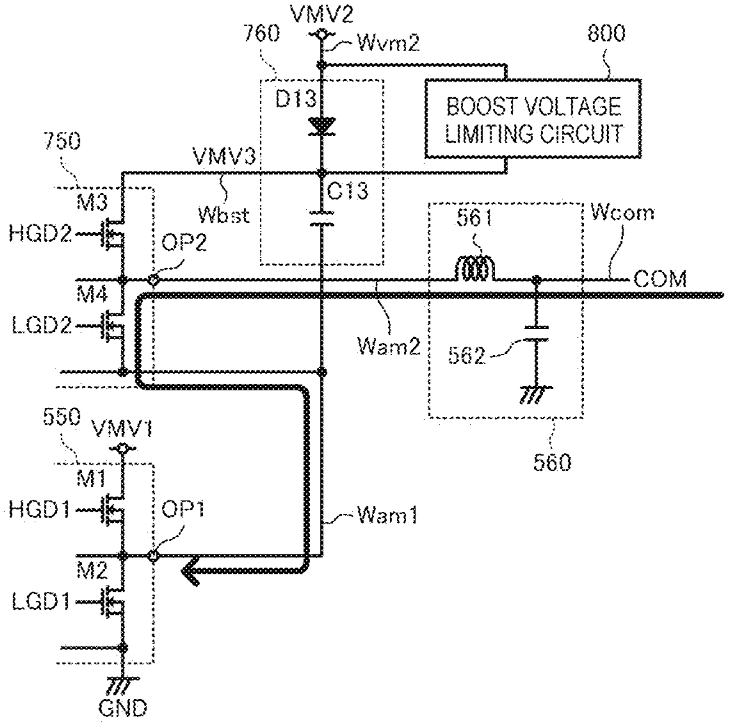
FIG. 9 is a diagram showing an outline of the current flowing through the drive circuit.
Figure 10:
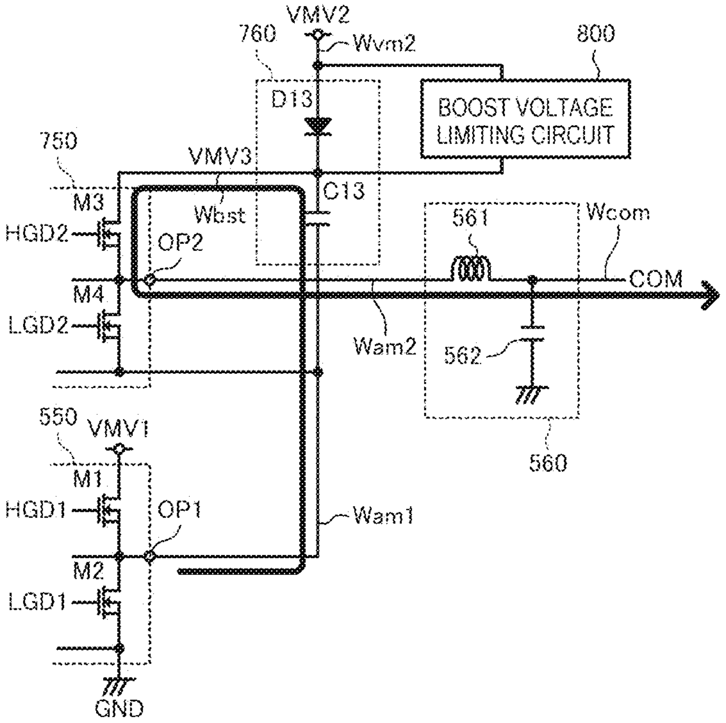
FIG. 10 is a diagram showing an outline of the current flowing through the drive circuit.
Figure 11:
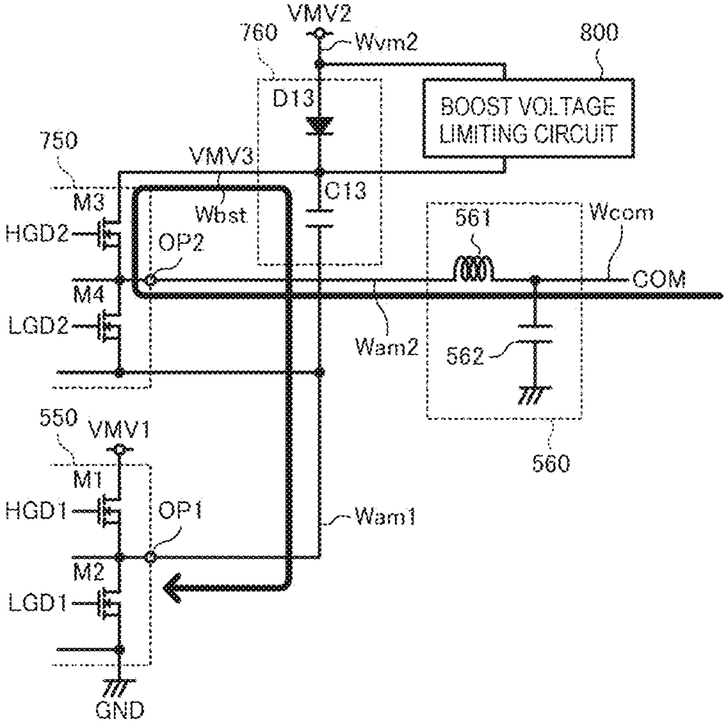
FIG. 11 is a diagram showing an outline of the current flowing through the drive circuit.

In describing the configuration and the operation of the boost voltage limiting circuit 800, first, a current flowing through the drive circuit 50, which is one of factors that cause the fluctuation in the voltage value between both ends of the capacitor C13, will be described. FIGS. 8 to 11 are diagrams showing an outline of a current flowing through the drive circuit 50. Specifically, FIG. 8 shows a direction of the current flowing through the drive circuit 50 when the level shift circuit 750 is in the first mode MD1 and the voltage value of the drive signal COM increases. FIG. 9 shows a direction of the current flowing through the drive circuit 50 when the level shift circuit 750 is in the first mode MD1 and the voltage value of the drive signal COM decreases. FIG. 10 shows a direction of the current flowing through the drive circuit 50 when the level shift circuit 750 is in the second mode MD2 and the voltage value of the drive signal COM increases. FIG. 11 shows a direction of the current flowing through the drive circuit 50 when the level shift circuit 750 is in the second mode MD2 and the voltage value of the drive signal COM decreases.

When the level shift circuit 750 is in the first mode MD1, the transistor M3 is non-conductive and the transistor M4 is conductive. Accordingly, the first output point OP1 and the second output point OP2 are electrically coupled via the transistor M4. Therefore, the first amplified modulation signal AMS1 output from the first output point OP1 propagates through the wirings Wam1, Wam2, and Wcom and the transistor M4, and is output from the second output point OP2 as the second amplified modulation signal AMS2. Then, the second amplified modulation signal AMS2 output from the second output point OP2 is smoothed in the demodulation circuit 560, and thus the drive circuit 50 outputs the drive signal COM. In such a first mode MD1, when the voltage value of the drive signal COM output by the drive circuit 50 increases, a current flows due to the propagation of the drive signal COM, and a charge is stored in the piezoelectric element 60. Therefore, when the level shift circuit 750 is in the first mode MD1 and the voltage value of the drive signal COM increases, as shown in FIG. 8, a current flows through the drive circuit 50 in a direction from the first output point OP1 to the second output point OP2 in an order of the wiring Wam1, the transistor M4, the wiring Wam2, and the wiring Wcom.

In contrast, in the first mode MD1, when the voltage value of the drive signal COM output by the drive circuit 50 decreases, the charge stored in the piezoelectric element 60 is discharged. Therefore, when the level shift circuit 750 is in the first mode MD1 and the voltage value of the drive signal COM decreases, as shown in FIG. 9, a current flows through the drive circuit 50 in a direction from the second output point OP2 to the first output point OP1 in an order of the wiring Wcom, the wiring Wam2, the transistor M4, and the wiring Wam1.

When the level shift circuit 750 is in the second mode MD2, the transistor M3 is conductive and the transistor M4 is non-conductive. Accordingly, the first output point OP1 and the second output point OP2 are electrically coupled via the transistor M4 and the boost circuit 760. Therefore, the first amplified modulation signal AMS1 output from the first output point OP1 propagates through the transistor M3 after the reference potential is level-shifted to the voltage vmv2 in the boost circuit 760, and is output from the second output point OP2 as the second amplified modulation signal AMS2. Then, the second amplified modulation signal AMS2 output from the second output point OP2 is smoothed in the demodulation circuit 560, and thus the drive circuit 50 outputs the drive signal COM. In such a second mode MD2, when the voltage value of the drive signal COM output by the drive circuit 50 increases, a current flows due to the propagation of the drive signal COM, and a charge is stored in the piezoelectric element 60. Therefore, when the level shift circuit 750 is in the second mode MD2 and the voltage value of the drive signal COM increases, as shown in FIG. 10, a current flows through the drive circuit 50 in the direction from the first output point OP1 to the second output point OP2 in an order of the wiring Wam1, the capacitor C13, the wiring Wbst, the transistor M3, the wiring Wam2, and the wiring Wcom.

In contrast, in the second mode MD2, when the voltage value of the drive signal COM output by the drive circuit 50 decreases, the charge stored in the piezoelectric element 60 is discharged. Therefore, when the level shift circuit 750 is in the second mode MD2 and the voltage value of the drive signal COM decreases, as shown in FIG. 11, a current flows through the drive circuit 50 in the direction from the second output point OP2 to the first output point OP1 in an order of the wiring Wcom, the wiring Wam2, the transistor M3, the wiring Wbst, the capacitor C13, and the wiring Wam1.

As described above, in the drive circuit 50 according to the embodiment, the capacitor C13 of the boost circuit 760 is provided in a path of the current flowing along with the propagation of the output drive signal COM. Therefore, the amount of charge stored in the capacitor C13 fluctuates with the propagation of the drive signal COM output by the drive circuit 50. As a result, the possibility that the voltage value generated between both ends of the capacitor C13 fluctuates increases.

Figure 12:
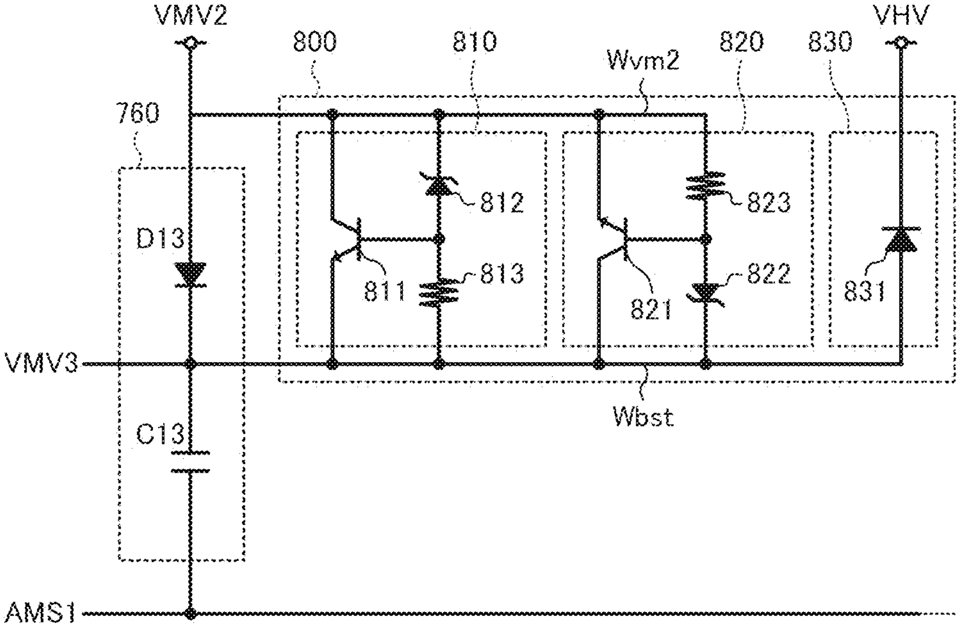
FIG. 12 is a diagram showing an example of a configuration of a boost voltage limiting circuit.

The configuration of the boost voltage limiting circuit 800 that limits the fluctuation in the voltage value that may occur between both ends of the capacitor C13 will be described. FIG. 12 is a diagram showing an example of the configuration of the boost voltage limiting circuit 800. As shown in FIG. 12, the boost voltage limiting circuit 800 includes a voltage decrease limiting circuit 810, a voltage increase limiting circuit 820, and a voltage increase protection circuit 830.

The voltage decrease limiting circuit 810 includes a transistor 811, a constant voltage diode 812, and a resistor 813. The transistor 811 is an NPN-type bipolar transistor, with a collector terminal electrically coupled to the wiring Wvm2 and an emitter terminal electrically coupled to the wiring Wbst. A base terminal of the transistor 811 is electrically coupled to an anode terminal of the constant voltage diode 812 and one end of the resistor 813. A cathode terminal of the constant voltage diode 812 is electrically coupled to the wiring Wvm2, and the other end of the resistor 813 is electrically coupled to the wiring Wbst. The voltage decrease limiting circuit 810 having the configuration as described above limits a decrease in the voltage value between both ends of the capacitor C13 by controlling a conduction state between the collector terminal and the emitter terminal of the transistor 811 based on a potential difference between the wiring Wvm2 and the wiring Wbst.

The voltage increase limiting circuit 820 includes a transistor 821, a constant voltage diode 822, and a resistor 823. The transistor 821 is an NPN-type bipolar transistor, with a collector terminal electrically coupled to the wiring Wbst and an emitter terminal electrically coupled to the wiring Wvm2. A base terminal of the transistor 821 is electrically coupled to an anode terminal of the constant voltage diode 822 and one end of the resistor 823. A cathode terminal of the constant voltage diode 822 is electrically coupled to the wiring Wbst, and the other end of the resistor 823 is electrically coupled to the wiring Wvm2. The voltage increase limiting circuit 820 having the configuration as described above limits a rise in the voltage value between both ends of the capacitor C13 by controlling a conduction state between the collector terminal and the emitter terminal of the transistor 821 based on the potential difference between the wiring Wvm2 and the wiring Wbst.

The voltage increase protection circuit 830 includes a diode 831. In the diode 831, an anode terminal is electrically coupled to the wiring Wbst, and the voltage signal VHV is supplied to a cathode terminal. When a voltage value of the wiring Wbst is larger than the voltage vhv, which is the voltage value of the voltage signal VHV, the voltage increase protection circuit 830 discharges a charge of the wiring Wbst, which is the charge stored in the capacitor C13 electrically coupled to the wiring Wbst, via the diode 831. Accordingly, the possibility that the voltage value of the wiring Wbst, that is, the voltage value of the other end of the capacitor C13 is larger than the voltage vhv is reduced.

The voltage signal VHV is a signal having a voltage value used, for example, in the selection control unit 210 that switches whether to supply the drive signal COM to the piezoelectric element 60, and is a signal having the highest potential among voltage values used in various circuits provided in a propagation path through which the drive signal COM propagates. By reducing the possibility that the voltage value of the wiring Wbst is larger than the voltage vhv by the voltage increase protection circuit 830, a possibility that an excessive voltage is applied to a circuit element provided in the propagation path with the propagation of the drive signal COM based on the voltage signal VMV3 is reduced, and as a result, the reliability of the liquid discharge device 1 including the drive circuit 50 is improved.

A specific example of an operation of limiting the fluctuation in the voltage value that may occur between both ends of the capacitor C13 in the boost voltage limiting circuit 800 having the configuration as described above will be described.

When the charge based on the voltage vmv2, which is the voltage value of the voltage signal VMV2, is normally stored between both ends of the capacitor C13 included in the boost circuit 760, the voltage value of the wiring Wbst, which is the voltage value of the other end of the capacitor C13, is a value obtained by adding the voltage vmv2 to the voltage value of the first amplified modulation signal AMS1. Here, as described above, the voltage value of the first amplified modulation signal AMS1 is the voltage vmv1 based on the voltage signal VMV1 when the transistor M1 is conductive, and is 0 V, which is the ground potential gnd, when the transistor M2 is conductive. Therefore, the voltage value of the other end of the capacitor C13 when the charge based on the voltage vmv2 is normally stored between both ends of the capacitor C13 changes between the voltage vmv2 and a value obtained by adding the voltage vmv1 to the voltage vmv2 according to the first amplified modulation signal AMS1.

When such a charge stored in the capacitor C13 is discharged by the current generated along with the propagation of the drive signal COM, the voltage value between both ends of the capacitor C13 decreases. As the voltage value between both ends of the capacitor C13 decreases, the voltage value of the voltage signal VMV3 also decreases. At this time, the voltage value of the voltage signal VMV2 propagating through the wiring Wvm2 is constant at the voltage vmv2. Therefore, as the voltage value between both ends of the capacitor C13 decreases, a potential difference ΔVlow between the voltage value of the wiring Wvm2 and the voltage value of the wiring Wbst, which is a value obtained by subtracting the voltage value of the voltage signal VMV3 from the voltage value of the voltage signal VMV2, increases. When the increasing potential difference ΔVlow exceeds a threshold voltage vtz1 defined by a Zener voltage vzd1 of the constant voltage diode 812 and a resistance value of the resistor 813, a current corresponding to a difference between the potential difference ΔVlow and the threshold voltage vtz1 is supplied to the base terminal of the transistor 811 via the constant voltage diode 812.

The transistor 811 controls the conduction state between the collector terminal and the emitter terminal according to an amount of current supplied to the base terminal. That is, the transistor 811 supplies an amount of current corresponding to the amount of current supplied to the base terminal from the wiring Wvm2 to the wiring Wbst. The charge is stored in the capacitor C13 electrically coupled to the wiring Wbst by the current supplied via the transistor 811. As a result, a decrease in the voltage value between both ends of the capacitor C13 is limited. That is, the voltage decrease limiting circuit 810 limits a decrease in the voltage value between both ends of the capacitor C13 according to the potential difference ΔVlow between the voltage value of the wiring Wvm2 and the voltage value of the wiring Wbst, which is a value obtained by subtracting the voltage value of the voltage signal VMV3 from the voltage value of the voltage signal VMV2.

As described above, a limited voltage value on a lower limit side of the voltage signal VMV3 is defined by the threshold voltage vtz1, which is defined by the Zener voltage vzd1 of the constant voltage diode 812 and the resistance value of the resistor 813. That is, the limited voltage value on the lower limit side of the voltage signal VMV3 is defined based on a value obtained by subtracting a value of the threshold voltage vtz1 from the voltage vmv2, which is the voltage value of the voltage signal VMV2. When the voltage value of the first amplified modulation signal AMS1 is the ground potential gnd, such a value of the threshold voltage vtz1 that defines the limited voltage value on the lower limit side of the voltage signal VMV3 is within a range in which the fluctuation of the voltage value of the voltage signal VMV3 is allowed, and is set such that, for example, the limited voltage value on the lower limit side of the voltage value of the voltage signal VMV3 is a value equal to or larger than 80% of the voltage vmv2, which is the voltage value of the voltage signal VMV2.

In contrast, when the charge is accumulated in the capacitor C13 due to the current generated along with the propagation of the drive signal COM, the voltage value between both ends of the capacitor C13 increases. As the voltage value between both ends of the capacitor C13 increases, the voltage value of the voltage signal VMV3 also increases. At this time, the voltage value of the voltage signal VMV2 propagating through the wiring Wvm2 is constant at the voltage vmv2. Therefore, as the voltage value between both ends of the capacitor C13 increases, a potential difference ΔVhi between the voltage value of the wiring Wbst and the voltage value of the wiring Wvm2, that is a value obtained by subtracting the voltage value of the voltage signal VMV2 from the voltage value of the voltage signal VMV3, increases. When the increasing potential difference ΔVhi exceeds a threshold voltage vtz2 defined by a Zener voltage vzd2 of the constant voltage diode 822 and a resistance value of the resistor 823, a current corresponding to a difference between the potential difference ΔVhi and the threshold voltage vtz2 is supplied to the base terminal of the transistor 821 via the constant voltage diode 822.

The transistor 821 controls the conduction state between the collector terminal and the emitter terminal according to an amount of current supplied to the base terminal. That is, the transistor 821 supplies an amount of current corresponding to the amount of current supplied to the base terminal, from the wiring Wbst to the wiring Wvm2. The charge stored in the capacitor C13 electrically coupled to the wiring Wbst is discharged by the current flowing through the transistor 821. As a result, an increase in the voltage value between both ends of the capacitor C13 is limited. That is, the voltage increase limiting circuit 820 limits an increase in the voltage value between both ends of the capacitor C13 according to the potential difference ΔVhi between the voltage value of the wiring Wbst and the voltage value of the wiring Wvm2, which is the value obtained by subtracting the voltage value of the voltage signal VMV2 from the voltage value of the voltage signal VMV3.

As described above, a limited voltage value on an upper limit side of the voltage signal VMV3 is defined by the threshold voltage vtz2 defined by the Zener voltage vzd2 of the constant voltage diode 822 and the resistance value of the resistor 823. That is, the limited voltage value on the upper limit side of the voltage signal VMV3 is defined based on a sum of the voltage vmv2, which is the voltage value of the voltage signal VMV2, and a value of the threshold voltage vtz2. In this way, when the voltage value of the first amplified modulation signal AMS1 is the voltage vmv1, which is the voltage value of the voltage signal VMV1, the value of the threshold voltage vtz2 that defines the limited voltage value on the upper limit side of the voltage signal VMV3 is within a range in which the fluctuation in the voltage value of the voltage signal VMV3 is allowed, and is set such that, for example, the limited voltage value on the upper limit side of the voltage value of the voltage signal VMV3 is a value equal to or less than 120% of a sum of the voltage vmv2, which is the voltage value of the voltage signal VMV2, and the voltage vmv1, which is the voltage value of the voltage signal VMV1.

In this case, the value of the threshold voltage vtz2 defined by the Zener voltage vzd2 of the constant voltage diode 822 and the resistance value of the resistor 823 may be set such that the sum of the values of the voltage vmv2 and the threshold voltage vtz2 is less than the voltage vhv, which is the voltage value of the voltage signal VHV. Accordingly, the voltage value of the voltage signal VMV3 is limited to a value less than the voltage vhv, which is the voltage value of the voltage signal VHV, by the voltage increase limiting circuit 820. As a result, the possibility that an excessive voltage is applied to the circuit element provided in the propagation path with the propagation of the drive signal COM based on the voltage signal VMV3 is further reduced, and as a result, the reliability of the liquid discharge device 1 including the drive circuit 50 is further improved.

As described above, the boost voltage limiting circuit 800 includes the voltage decrease limiting circuit 810 and the voltage increase limiting circuit 820.

The voltage decrease limiting circuit 810 includes the constant voltage diode 812, the resistor 813, and the transistor 811. The constant voltage diode 812 includes the cathode terminal electrically coupled to the wiring Wvm2 and the anode terminal electrically coupled to one end of the resistor 813. The other end of the resistor 813 is electrically coupled to the wiring Wbst. In the transistor 811, the base terminal is electrically coupled to the anode terminal of the constant voltage diode 812 and the one end of the resistor 813, the collector terminal is electrically coupled to the wiring Wvm2, and the emitter terminal is electrically coupled to the wiring Wbst. When a potential of the wiring Wvm2 is larger than a potential of the wiring Wbst and the potential difference between the wiring Wvm2 and the wiring Wbst is larger than the threshold voltage vtz1, the voltage decrease limiting circuit 810 makes conductive between the wiring Wvm2 and the wiring Wbst.

The voltage increase limiting circuit 820 includes the constant voltage diode 822, the resistor 823, and the transistor 821. The constant voltage diode 822 includes the cathode terminal electrically coupled to the wiring Wbst and the anode terminal electrically coupled to one end of the resistor 823. The other end of the resistor 823 is electrically coupled to the wiring Wvm2. In the transistor 821, the base terminal is electrically coupled to the anode terminal of the constant voltage diode 822 and the one end of the resistor 823, the collector terminal is electrically coupled to the wiring Wbst, and the emitter terminal is electrically coupled to the wiring Wvm2. When the potential of the wiring Wvm2 is less than the potential of the wiring Wbst and the potential difference between the wiring Wvm2 and the wiring Wbst is larger than the threshold voltage vtz2, the voltage increase limiting circuit 820 makes conductive between the wiring Wvm2 and the wiring Wbst.

That is, the boost voltage limiting circuit 800 included in the drive circuit 50 of the liquid discharge device 1 according to the embodiment is electrically coupled to the wiring Wvm2 and the wiring Wbst. The boost voltage limiting circuit 800 switches the conduction state between the wiring Wvm2 and the wiring Wbst according to the potential differences ΔVlow and ΔVhi between the voltage value of the wiring Wvm2 and the voltage value of the wiring Wbst.

The piezoelectric element 60 is an example of a capacitive load, and the drive circuit 50 that outputs the drive signal COM for driving the piezoelectric element 60 corresponds to the capacitive load drive circuit. The D/A conversion circuit 510 is an example of a DA conversion circuit. The pulse modulation circuit 520 is an example of a modulation circuit. The amplifier circuit 550 is an example of a first digital amplifier circuit. The demodulation circuit 560 is an example of a smoothing circuit. The level shift circuit 750 is an example of a second digital amplifier circuit. The boost circuit 760 is an example of a bootstrap circuit. The boost voltage limiting circuit 800 is an example of a voltage limiting circuit. The capacitor C13 is an example of a capacitor element. The diode D13 is an example of a diode element. The constant voltage diode 812 is an example of a first Zener diode. The constant voltage diode 822 is an example of a second Zener diode. The resistor 813 is an example of a first resistance element. The resistor 823 is an example of a second resistance element. The transistor 811 is an example of a first transistor. The transistor 821 is an example of a second transistor. The ground signal GND is an example of a first voltage signal. The ground potential gnd is an example of a first potential. The voltage signal VMV1 is an example of a second voltage signal. The voltage vmv1 is an example of a second potential. The voltage signal VMV2 is an example of a third voltage signal. The voltage vmv3 is an example of a third potential. The first amplified modulation signal AMS1 is an example of a first amplified signal. The second amplified modulation signal AMS2 is an example of a second amplified signal. The voltage signal VMV3 is an example of a boot voltage signal. The base drive signal aA is an example of an analog base drive signal. The wiring Wgnd is an example of a first propagation node. The wiring Wvm1 is an example of a second propagation node. The wiring Wvm2 is an example of a third propagation node. The wiring Wam1 is an example of a first output node. The wiring Wbst is an example of a second output node. The wiring Wam2 is an example of a third output node. The threshold voltage vtz1 is an example of a first threshold. The threshold voltage vtz2 is an example of a second threshold.

4. Functions and Effects

As described above, in the liquid discharge device 1 according to the embodiment, in the drive circuit 50, the amplifier circuit 550 generates the first amplified modulation signal AMS1 obtained by amplifying the modulation signal MS by the switching operations of the transistors M1, M2, the level shift circuit 750 outputs, via the transistors M3 and M4, the first amplified modulation signal AMS1 or a signal obtained by shifting the potential of the first amplified modulation signal AMS1 as the second amplified modulation signal AMS2 according to the potential of the level switching signal LS, and the demodulation circuit 560 demodulates the second amplified modulation signal AMS2 and outputs the drive signal COM. Accordingly, the voltage values of the voltage signals VMV1 and VMV2 can be reduced relative to the voltage value of the drive signal COM output by the drive circuit 50. As a result, on-resistances of the transistors M1, M2, M3, and M4 can be reduced, and therefore a switching loss generated in each of the transistors M1, M2, M3, and M4 can be reduced. As a result, the power consumption of the drive circuit 50 can be reduced.

In the liquid discharge device 1 according to the embodiment, the boost voltage limiting circuit 800 included in the drive circuit 50 is electrically coupled to the wiring Wvm2 and the wiring Wbst, and switches the conduction state between the wiring Wvm2 and the wiring Wbst according to the potential differences ΔVlow and ΔVhi between the voltage value of the wiring Wvm2 and the voltage value of the wiring Wbst. Accordingly, even when the voltage value between both ends of the capacitor C13 fluctuates due to unintended accumulation of charge in or unintended discharge from the capacitor C13 included in the boost circuit 760 electrically coupled to the wiring Wbst, the voltage value between both ends of the capacitor C13 can be limited based on the voltage vmv2, which is the voltage value of the voltage signal VMV2 propagating through the wiring Wvm2. As a result, the signal accuracy of the second amplified modulation signal AMS2 output from the level shift circuit 750 electrically coupled to the wiring Wbst is improved, and the signal accuracy of the drive signal COM obtained by smoothing the second amplified modulation signal AMS2 is also improved as the signal accuracy of the second amplified modulation signal AMS2 is improved. That is, the possibility that a distortion occurs in the signal waveform of the drive signal COM output by the drive circuit 50 is reduced.

In the drive circuit 50 included in the liquid discharge device 1 according to the embodiment, the boost voltage limiting circuit 800 includes the voltage decrease limiting circuit 810 that makes conductive between the wiring Wvm2 and the wiring Wbst when the potential of the wiring Wvm2 is larger than the potential of the wiring Wbst and the potential difference between the wiring Wvm2 and the wiring Wbst is larger than the threshold voltage vtz1, and the voltage increase limiting circuit 820 that makes conductive between the wiring Wvm2 and the wiring Wbst when the potential of the wiring Wvm2 is less than the potential of the wiring Wbst and the potential difference between the wiring Wvm2 and the wiring Wbst is larger than the threshold voltage vtz2. Accordingly, the voltage value between both ends of the capacitor C13 is limited to a predetermined voltage range by the voltage decrease limiting circuit 810 and the voltage increase limiting circuit 820. As a result, the signal accuracy of the second amplified modulation signal AMS2 output from the level shift circuit 750 electrically coupled to the wiring Wbst is further improved, and the signal accuracy of the drive signal COM obtained by smoothing the second amplified modulation signal AMS2 is also further improved as the signal accuracy of the second amplified modulation signal AMS2 is further improved. That is, the possibility that a distortion occurs in the signal waveform of the drive signal COM output by the drive circuit 50 is further reduced.

5. Modification

In the liquid discharge device 1 described above, a description has been made in which the boost voltage limiting circuit 800 included in the drive circuit 50 includes the voltage decrease limiting circuit 810, the voltage increase limiting circuit 820, and the voltage increase protection circuit 830. The boost voltage limiting circuit 800 included in the drive circuit 50 may include at least one of the voltage decrease limiting circuit 810 and the voltage increase limiting circuit 820, and even in this case, it is possible to reduce the possibility that a distortion occurs in the signal waveform of the drive signal COM output by the drive circuit 50.

Figure 13:
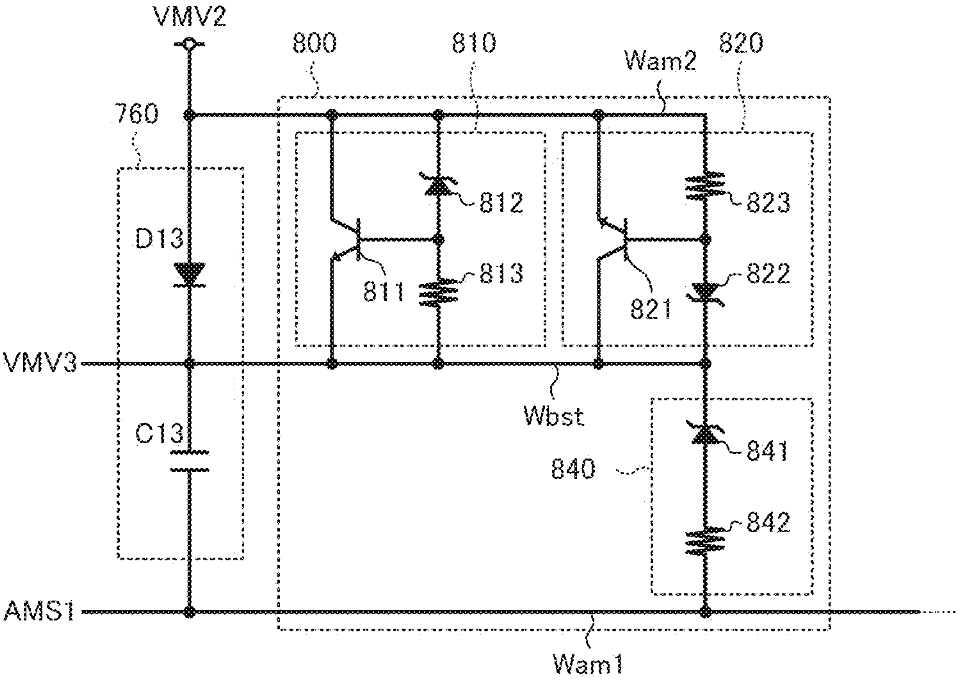
FIG. 13 is a diagram showing an example of a configuration of a boost voltage limiting circuit in a modification example.

Further, in the liquid discharge device 1 described above, the boost voltage limiting circuit 800 included in the drive circuit 50 may include a voltage increase protection circuit 840 instead of the voltage increase protection circuit 830 as shown in FIG. 13. FIG. 13 is a diagram showing an example of a configuration of the boost voltage limiting circuit 800 according to a modification.

The voltage increase protection circuit 840 includes a constant voltage diode 841 and a resistor 842. A cathode terminal of the constant voltage diode 841 is electrically coupled to the wiring Wbst, and an anode terminal of the constant voltage diode 841 is electrically coupled to one end of the resistor 842. The other end of the resistor 842 is electrically coupled to the wiring Wam1.

In the voltage increase protection circuit 840 having the configuration as described above, when a voltage value between both ends of the capacitor C13, that is a potential difference ΔVbst between a voltage value of the wiring Wbst and a voltage value of the wiring Wam1, exceeds a threshold voltage vtz3 defined by a Zener voltage vzd3 of the constant voltage diode 841 and a resistance value of the resistor 842, a current corresponding to a difference between the potential difference ΔVbst and the threshold voltage vtz3 flows to the wiring Wam1 via the constant voltage diode 841 and the resistor 842. Accordingly, the charge stored in the capacitor C13 electrically coupled to the wiring Wbst is discharged to the wiring Wam1. As a result, a voltage value of the voltage signal VMV3 that is the voltage value of the wiring Wbst is limited based on a voltage value of the first amplified modulation signal AMS1 propagating through the wiring Wam1 and the threshold voltage vtz3.

In this case, a value of the threshold voltage vtz3 defined by the Zener voltage vzd3 of the constant voltage diode 841 and the resistance value of the resistor 842 may be set such that a sum of values of the voltage vmv1 and the threshold voltage vtz2 is less than the voltage vhv, which is the voltage value of the voltage signal VHV. Accordingly, the voltage value of the voltage signal VMV3 is limited to a value less than the voltage vhv, which is the voltage value of the voltage signal VHV, by the voltage increase limiting circuit 820. As a result, a possibility that an excessive voltage is applied to the circuit element provided in the propagation path with the propagation of the drive signal COM based on the voltage signal VMV3 is further reduced, and as a result, the reliability of the liquid discharge device 1 including the drive circuit 50 is further improved.

Even when the boost voltage limiting circuit 800 included in the drive circuit 50 includes the voltage increase protection circuit 840 as shown in FIG. 13 instead of or in addition to the voltage increase protection circuit 830 shown in FIG. 12, the same functions and effects as those of the above-described embodiment can be obtained.

Although an embodiment has been described, the present disclosure is not limited to the embodiment and can be implemented in various aspects without departing from the gist thereof. For example, the embodiment and the modification may be combined appropriately.

The present disclosure includes substantially the same configuration as the configuration described in the embodiment, such as a configuration having the same function, the same method, and the same result, or a configuration having the same object and the same effect. The present disclosure has configurations obtained by replacing non-essential portions of the configurations described in the embodiment. The present disclosure has a configuration in which the same functions and effects as the configuration described in the embodiment can be obtained and a configuration in which the same object as the configuration described in the embodiment can be achieved. The present disclosure has a configuration obtained by adding a known technique to the configuration described in the embodiment.

The following contents are derived from the above-described embodiment.

One aspect of a capacitive load drive circuit is a capacitive load drive circuit for outputting a drive signal for driving a capacitive load, and the capacitive load drive circuit includes:

a first digital amplifier circuit that is electrically coupled to a first propagation node configured to allow a first voltage signal of a first potential to propagate therethrough and a second propagation node configured to allow a second voltage signal of a second potential to propagate therethrough, and that is configured to output a first amplified signal to a first output node;

a bootstrap circuit that is electrically coupled to the first output node and a third propagation node configured to allow a third voltage signal of a third potential to propagate therethrough and that is configured to output a boot voltage signal to a second output node;

a second digital amplifier circuit coupled to the first output node and the second output node and configured to output a second amplified signal to a third output node;

a smoothing circuit configured to smooth the second amplified signal and output the second amplified signal thus smoothed as the drive signal; and a voltage limiting circuit electrically coupled to the third propagation node and the second output node and configured to switch a conduction state between the third propagation node and the second output node, in which the bootstrap circuit includes a capacitor element including one end electrically coupled to the first output node and the other end electrically coupled to the second output node, and a diode element including an anode terminal electrically coupled to the third propagation node and a cathode terminal electrically coupled to the second output node, and the voltage limiting circuit switches the conduction state between the third propagation node and the second output node according to a potential difference between the third propagation node and the second output node.

In the capacitive load drive circuit, the voltage limiting circuit switches the conduction state between the third propagation node and the second output node according to the potential difference between the third propagation node and the second output node, thereby limiting the voltage value of the boot voltage signal by the third voltage signal of the third potential propagating through the third propagation node even when the voltage value of the boot voltage signal output to the second output node by the bootstrap circuit increases or decreases. Therefore, the signal accuracy of the second amplified signal output to the third output node by the second digital amplifier circuit coupled to the first output node and the second output node is improved. As a result, the possibility that a distortion occurs in the signal waveform of the drive signal, which is obtained by smoothing and outputting the second amplified signal by the smoothing circuit, is reduced.

In one aspect of the capacitive load drive circuit, when a potential of the third propagation node is larger than a potential of the second output node and the potential difference between the third propagation node and the second output node is larger than a first threshold, the voltage limiting circuit may make electrically conductive between the third propagation node and the second output node.

In the capacitive load drive circuit, even when the voltage value of the boot voltage signal output from the bootstrap circuit to the second output node decreases, the voltage value of the boot voltage signal is limited by the third voltage signal of the third potential propagating through the third propagation node in the voltage limiting circuit. Therefore, the signal accuracy of the second amplified signal output to the third output node by the second digital amplifier circuit coupled to the first output node and the second output node is improved, and the possibility that a distortion occurs in the signal waveform of the drive signal, which is obtained by smoothing and outputting the second amplified signal by the smoothing circuit, is reduced.

In one aspect of the capacitive load drive circuit, the voltage limiting circuit may include a first Zener diode, a first resistance element, and a first transistor, the first Zener diode may include a cathode terminal electrically coupled to the third propagation node and an anode terminal electrically coupled to one end of the first resistance element, the other end of the first resistance element may be electrically coupled to the second output node, and the first transistor may include a base terminal electrically coupled to the anode terminal of the first Zener diode and the one end of the first resistance element, a collector terminal electrically coupled to the third propagation node, and an emitter terminal electrically coupled to the second output node.

In one aspect of the capacitive load drive circuit, when a potential of the third propagation node is less than a potential of the second output node and the potential difference between the third propagation node and the second output node is larger than a second threshold, the voltage limiting circuit may make conductive between the third propagation node and the second output node.

In the capacitive load drive circuit, even when the voltage value of the boot voltage signal output from the bootstrap circuit to the second output node increases, the voltage value of the boot voltage signal is limited by the third voltage signal of the third potential propagating through the third propagation node in the voltage limiting circuit. Therefore, the signal accuracy of the second amplified signal output to the third output node by the second digital amplifier circuit coupled to the first output node and the second output node is improved, and the possibility that a distortion occurs in the signal waveform of the drive signal, which is obtained by smoothing and outputting the second amplified signal by the smoothing circuit, is reduced.

In one aspect of the capacitive load drive circuit, the voltage limiting circuit may include a second Zener diode, a second resistance element, and a second transistor, the second Zener diode may include a cathode terminal electrically coupled to the second output node and an anode terminal electrically coupled to one end of the second resistance element, the other end of the second resistance element may be electrically coupled to the third propagation node, and the second transistor may include a base terminal electrically coupled to the anode terminal of the second Zener diode and the one end of the second resistance element, a collector terminal electrically coupled to the second output node, and an emitter terminal electrically coupled to the third propagation node.

One aspect of the capacitive load drive circuit may further include:

a DA conversion circuit configured to convert a base drive signal that is a basis of the drive signal into an analog base drive signal;

a modulation circuit configured to output a modulation signal obtained by modulating the analog base drive signal; and a level switching signal output circuit configured to output a level switching signal based on the base drive signal, in which the first digital amplifier circuit may output the first amplified signal obtained by amplifying the modulation signal based on the first potential and the second potential, and the second digital amplifier circuit may select, according to the level switching signal, a signal obtained by shifting a reference potential of the first amplified signal based on the third potential or a signal obtained by not shifting the reference potential of the first amplified signal, and output the selected signal as the second amplified signal.

In the capacitive load drive circuit, the first digital amplifier circuit outputs the first amplified signal obtained by amplifying the modulation signal based on the first potential and the second potential, and the second digital amplifier circuit selects, according to the level switching signal, the signal obtained by shifting the reference potential of the first amplified signal based on the third potential or a signal obtained by not shifting the reference potential of the first amplified signal and outputs the selected signal as the second amplified signal, thereby reducing the withstand voltage of the transistor elements included in the first digital amplifier circuit and the second digital amplifier circuit. Accordingly, the on-resistances of the transistor elements included in the first digital amplifier circuit and the second digital amplifier circuit can be reduced, and the loss in the transistor elements is reduced. As a result, the power consumption in the capacitive load drive circuit is reduced.

One aspect of a liquid discharge device includes:

a discharge unit configured to discharge a liquid by driving of a capacitive load; and a capacitive load drive circuit configured to output a drive signal for driving the capacitive load, in which the capacitive load drive circuit includes a first digital amplifier circuit that is electrically coupled to a first propagation node configured to allow a first voltage signal of a first potential to propagate therethrough and a second propagation node configured to allow a second voltage signal of a second potential to propagate therethrough, and that is configured to output a first amplified signal to a first output node, a bootstrap circuit that is electrically coupled to the first output node and a third propagation node configured to allow a third voltage signal of a third potential to propagate therethrough and that is configured to output a boot voltage signal to a second output node, a second digital amplifier circuit coupled to the first output node and the second output node and configured to output a second amplified signal to a third output node, a smoothing circuit configured to smooth the second amplified signal and output the second amplified signal thus smoothed as the drive signal, and a voltage limiting circuit electrically coupled to the third propagation node and the second output node and configured to switch a conduction state between the third propagation node and the second output node, in which the bootstrap circuit includes a capacitor element including one end electrically coupled to the first output node and the other end electrically coupled to the second output node, and a diode element including an anode terminal electrically coupled to the third propagation node and a cathode terminal electrically coupled to the second output node, and the voltage limiting circuit switches the conduction state between the third propagation node and the second output node according to a potential difference between the third propagation node and the second output node.

In the liquid discharge device, the voltage limiting circuit included in the capacitive load drive circuit switches the conduction state between the third propagation node and the second output node according to the potential difference between the third propagation node and the second output node, thereby limiting the voltage value of the boot voltage signal by the third voltage signal of the third potential propagating through the third propagation node even when the voltage value of the boot voltage signal output to the second output node by the bootstrap circuit increases or decreases. Therefore, the signal accuracy of the second amplified signal output to the third output node by the second digital amplifier circuit coupled to the first output node and the second output node is improved. As a result, the possibility that a distortion occurs in the signal waveform of the drive signal, which is obtained by smoothing and outputting the second amplified signal by the smoothing circuit, is reduced.

In one aspect of the liquid discharge device, when a potential of the third propagation node is larger than a potential of the second output node and the potential difference between the third propagation node and the second output node is larger than a first threshold, the voltage limiting circuit may make electrically conductive between the third propagation node and the second output node.

In the liquid discharge device, even when the voltage value of the boot voltage signal output from the bootstrap circuit included in the capacitive load drive circuit to the second output node decreases, the voltage value of the boot voltage signal is limited by the third voltage signal of the third potential propagating through the third propagation node in the voltage limiting circuit. Therefore, the signal accuracy of the second amplified signal output to the third output node by the second digital amplifier circuit coupled to the first output node and the second output node is improved, and the possibility that a distortion occurs in the signal waveform of the drive signal, which is obtained by smoothing and outputting the second amplified signal by the smoothing circuit, is reduced.

In one aspect of the liquid discharge device, the voltage limiting circuit may include a first Zener diode, a first resistance element, and a first transistor, the first Zener diode may include a cathode terminal electrically coupled to the third propagation node and an anode terminal electrically coupled to one end of the first resistance element, the other end of the first resistance element may be electrically coupled to the second output node, and the first transistor may include a base terminal electrically coupled to the anode terminal of the first Zener diode and the one end of the first resistance element, a collector terminal electrically coupled to the third propagation node, and an emitter terminal electrically coupled to the second output node.

In one aspect of the liquid discharge device, when a potential of the third propagation node is less than a potential of the second output node and the potential difference between the third propagation node and the second output node is larger than a second threshold, the voltage limiting circuit may make conductive between the third propagation node and the second output node.

In the liquid discharge device, even when the voltage value of the boot voltage signal output from the bootstrap circuit included in the capacitive load drive circuit to the second output node increases, the voltage value of the boot voltage signal is limited by the third voltage signal of the third potential propagating through the third propagation node in the voltage limiting circuit. Therefore, the signal accuracy of the second amplified signal output to the third output node by the second digital amplifier circuit coupled to the first output node and the second output node is improved, and the possibility that a distortion occurs in the signal waveform of the drive signal, which is obtained by smoothing and outputting the second amplified signal by the smoothing circuit, is reduced.

In one aspect of the liquid discharge device, the voltage limiting circuit may include a second Zener diode, a second resistance element, and a second transistor, the second Zener diode may include a cathode terminal electrically coupled to the second output node and an anode terminal electrically coupled to one end of the second resistance element, the other end of the second resistance element may be electrically coupled to the third propagation node, and the second transistor may include a base terminal electrically coupled to the anode terminal of the second Zener diode and the one end of the second resistance element, a collector terminal electrically coupled to the second output node, and an emitter terminal electrically coupled to the third propagation node.

One aspect of the liquid discharge device may further include:

a DA conversion circuit configured to convert a base drive signal that is a basis of the drive signal into an analog base drive signal;

a modulation circuit configured to output a modulation signal obtained by modulating the analog base drive signal; and a level switching signal output circuit configured to output a level switching signal based on the base drive signal, in which the first digital amplifier circuit may output the first amplified signal obtained by amplifying the modulation signal based on the first potential and the second potential, and the second digital amplifier circuit may select, according to the level switching signal, a signal obtained by shifting a reference potential of the first amplified signal based on the third potential or a signal obtained by not shifting the reference potential of the first amplified signal, and output the selected signal as the second amplified signal.

In the liquid discharge device, the first digital amplifier circuit included in the capacitive load drive circuit outputs the first amplified signal obtained by amplifying the modulation signal based on the first potential and the second potential, and the second digital amplifier circuit selects, according to the level switching signal, the signal obtained by shifting the reference potential of the first amplified signal based on the third potential or a signal obtained by not shifting the reference potential of the first amplified signal and outputs the selected signal as the second amplified signal, thereby reducing the withstand voltages of the transistor elements included in the first digital amplifier circuit and the second digital amplifier circuit. Accordingly, the on-resistances of the transistor elements included in the first digital amplifier circuit and the second digital amplifier circuit can be reduced, and the loss in the transistor elements is reduced. As a result, the power consumption in the capacitive load drive circuit is reduced, and the power consumption of the liquid discharge device is reduced.

What is claimed is:

1. A capacitive load drive circuit for outputting a drive signal for driving a capacitive load, the capacitive load drive circuit comprising:

a first digital amplifier circuit that is electrically coupled to a first propagation node configured to allow a first voltage signal of a first potential to propagate therethrough and a second propagation node configured to allow a second voltage signal of a second potential to propagate therethrough, and that is configured to output a first amplified signal to a first output node;

a bootstrap circuit that is electrically coupled to the first output node and a third propagation node configured to allow a third voltage signal of a third potential to propagate therethrough, and that is configured to output a boot voltage signal to a second output node;

a second digital amplifier circuit coupled to the first output node and the second output node and configured to output a second amplified signal to a third output node;

a smoothing circuit configured to smooth the second amplified signal and output the second amplified signal thus smoothed as the drive signal; and a voltage limiting circuit electrically coupled to the third propagation node and the second output node and configured to switch a conduction state between the third propagation node and the second output node, wherein the bootstrap circuit includes a capacitor element including one end electrically coupled to the first output node and another end electrically coupled to the second output node, and a diode element including an anode terminal electrically coupled to the third propagation node and a cathode terminal electrically coupled to the second output node, and the voltage limiting circuit switches the conduction state between the third propagation node and the second output node according to a potential difference between the third propagation node and the second output node.

2. The capacitive load drive circuit according to claim 1, wherein when a potential of the third propagation node is larger than a potential of the second output node and the potential difference between the third propagation node and the second output node is larger than a first threshold, the voltage limiting circuit makes conductive between the third propagation node and the second output node.

3. The capacitive load drive circuit according to claim 2, wherein the voltage limiting circuit includes a first Zener diode, a first resistance element, and a first transistor, the first Zener diode includes a cathode terminal electrically coupled to the third propagation node and an anode terminal electrically coupled to one end of the first resistance element, another end of the first resistance element is electrically coupled to the second output node, and the first transistor includes a base terminal electrically coupled to the anode terminal of the first Zener diode and the one end of the first resistance element, a collector terminal electrically coupled to the third propagation node, and an emitter terminal electrically coupled to the second output node.

4. The capacitive load drive circuit according to claim 1, wherein when a potential of the third propagation node is less than a potential of the second output node and a potential difference between the third propagation node and the second output node is larger than a second threshold, the voltage limiting circuit makes conductive between the third propagation node and the second output node.

5. The capacitive load drive circuit according to claim 4, wherein the voltage limiting circuit includes a second Zener diode, a second resistance element, and a second transistor, the second Zener diode includes a cathode terminal electrically coupled to the second output node and an anode terminal electrically coupled to one end of the second resistance element, another end of the second resistance element is electrically coupled to the third propagation node, and the second transistor includes a base terminal electrically coupled to the anode terminal of the second Zener diode and the one end of the second resistance element, a collector terminal electrically coupled to the second output node, and an emitter terminal electrically coupled to the third propagation node.

6. The capacitive load drive circuit according to claim 1, further comprising:

a DA conversion circuit configured to convert a base drive signal that is a basis of the drive signal into an analog base drive signal;

a modulation circuit configured to output a modulation signal obtained by modulating the analog base drive signal; and a level switching signal output circuit configured to output a level switching signal based on the base drive signal, wherein the first digital amplifier circuit outputs the first amplified signal obtained by amplifying the modulation signal based on the first potential and the second potential, and the second digital amplifier circuit selects, according to the level switching signal, a signal obtained by shifting a reference potential of the first amplified signal based on the third potential or a signal obtained by not shifting the reference potential of the first amplified signal, and outputs the signal thus selected as the second amplified signal.

7. A liquid discharge device comprising:

a discharge unit configured to discharge a liquid by driving of a capacitive load; and a capacitive load drive circuit configured to output a drive signal for driving the capacitive load, wherein the capacitive load drive circuit includes a first digital amplifier circuit that is electrically coupled to a first propagation node configured to allow a first voltage signal of a first potential to propagate therethrough and a second propagation node configured to allow a second voltage signal of a second potential to propagate therethrough, and that is configured to output a first amplified signal to a first output node, a bootstrap circuit that is electrically coupled to the first output node and a third propagation node configured to allow a third voltage signal of a third potential to propagate therethrough and that is configured to output a boot voltage signal to a second output node, a second digital amplifier circuit coupled to the first output node and the second output node and configured to output a second amplified signal to a third output node, a smoothing circuit configured to smooth the second amplified signal and output the second amplified signal thus smoothed as the drive signal, and a voltage limiting circuit electrically coupled to the third propagation node and the second output node and configured to switch a conduction state between the third propagation node and the second output node, in which the bootstrap circuit includes a capacitor element including one end electrically coupled to the first output node and another end electrically coupled to the second output node, and a diode element including an anode terminal electrically coupled to the third propagation node and a cathode terminal electrically coupled to the second output node, and the voltage limiting circuit switches the conduction state between the third propagation node and the second output node according to a potential difference between the third propagation node and the second output node.

8. The liquid discharge device according to claim 7, wherein when a potential of the third propagation node is larger than a potential of the second output node and the potential difference between the third propagation node and the second output node is larger than a first threshold, the voltage limiting circuit makes conductive between the third propagation node and the second output node.

9. The liquid discharge device according to claim 8, wherein the voltage limiting circuit includes a first Zener diode, a first resistance element, and a first transistor, the first Zener diode includes a cathode terminal electrically coupled to the third propagation node and an anode terminal electrically coupled to one end of the first resistance element, another end of the first resistance element is electrically coupled to the second output node, and the first transistor includes a base terminal electrically coupled to the anode terminal of the first Zener diode and the one end of the first resistance element, a collector terminal electrically coupled to the third propagation node, and an emitter terminal electrically coupled to the second output node.

10. The liquid discharge device according to claim 7, wherein when a potential of the third propagation node is less than a potential of the second output node and the potential difference between the third propagation node and the second output node is larger than a second threshold, the voltage limiting circuit makes conductive between the third propagation node and the second output node.

11. The liquid discharge device according to claim 10, wherein the voltage limiting circuit includes a second Zener diode, a second resistance element, and a second transistor, the second Zener diode includes a cathode terminal electrically coupled to the second output node and an anode terminal electrically coupled to one end of the second resistance element, another end of the second resistance element is electrically coupled to the third propagation node, and the second transistor includes a base terminal electrically coupled to the anode terminal of the second Zener diode and the one end of the second resistance element, a collector terminal electrically coupled to the second output node, and an emitter terminal electrically coupled to the third propagation node.

12. The liquid discharge device according to claim 7, further comprising:

a DA conversion circuit configured to convert a base drive signal that is a basis of the drive signal into an analog base drive signal;

a modulation circuit configured to output a modulation signal obtained by modulating the analog base drive signal; and a level switching signal output circuit configured to output a level switching signal based on the base drive signal, wherein the first digital amplifier circuit outputs the first amplified signal obtained by amplifying the modulation signal based on the first potential and the second potential, and the second digital amplifier circuit selects, according to the level switching signal, a signal obtained by shifting a reference potential of the first amplified signal based on the third potential or a signal obtained by not shifting the reference potential of the first amplified signal, and outputs the signal thus selected as the second amplified signal.

* * * * *